United States Patent
Shiva et al.

(10) Patent No.: US 11,307,742 B2
(45) Date of Patent: *Apr. 19, 2022

(54) INTERACTIVE PERSONALIZED GRAPHICAL FEEDBACK OVERLAY

(71) Applicant: Groupon, Inc., Chicago, IL (US)

(72) Inventors: Arash Shiva, Mountain View, CA (US); Marius Gabriel Ciocirlan, Mountain View, CA (US); Fabio Sisinni, Mountain View, CA (US)

(73) Assignee: GROUPON, INC., Chicago, IL (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/257,335

(22) Filed: Jan. 25, 2019

(65) Prior Publication Data
US 2019/0324627 A1   Oct. 24, 2019

Related U.S. Application Data

(63) Continuation of application No. 14/312,591, filed on Jun. 23, 2014, now Pat. No. 10,228,829.
(Continued)

(51) Int. Cl.
*G06F 3/0484* (2013.01)
*G06F 3/0481* (2013.01)
(Continued)

(52) U.S. Cl.
CPC ...... *G06F 3/04842* (2013.01); *G06F 3/04817* (2013.01); *G06Q 30/0241* (2013.01); *G06F 3/0481* (2013.01); *G06F 3/0482* (2013.01); *G06Q 30/0207* (2013.01); *G06Q 30/0251* (2013.01); *G06Q 30/0269* (2013.01); *G06Q 30/0271* (2013.01)

(58) Field of Classification Search
CPC .... G06F 3/0484; G06F 3/0481; G06F 3/0482; G06F 3/04842; G06F 3/04817; G06Q 30/0241; G06Q 30/0207; G06Q 30/0251; G06Q 30/0269; G06Q 30/0271
See application file for complete search history.

(56) References Cited

U.S. PATENT DOCUMENTS 5,347,626 A    9/1994  Hoeber et al.
5,914,716 A    6/1999  Rubin et al.
(Continued)

OTHER PUBLICATIONS

U.S. Appl. No. 13/930,519, filed Jun. 28, 2013, In re: Ayars et al. entitled Method And Apparatus For Generating An Electronic Communication, 65 pages.

*Primary Examiner* — Ting Z Lee
(74) *Attorney, Agent, or Firm* — Alston & Bird LLP

(57) ABSTRACT

Provided herein are systems, methods and computer readable media for providing an interface configured to provide a consumer with a number of promotions. In providing such functionality, the system can be configured to, for example, monitor and detect a consumer's selection of a preferred promotion. Upon determining the selection of a preferred promotion, a interactive feedback overlay may be configured to provide an indication acknowledging the consumer's selection of the preferred promotion. In some embodiments, the system may be configured to receive an indication corresponding to a user's desire to remove a particular promotion from a promotional interface.

19 Claims, 16 Drawing Sheets

Related U.S. Application Data

(60) Provisional application No. 61/840,939, filed on Jun. 28, 2013.

(51) Int. Cl.
*G06F 3/0482* (2013.01)
*G06Q 30/02* (2012.01)
*G06F 3/04842* (2022.01)
*G06F 3/04817* (2022.01)

(56) References Cited

U.S. PATENT DOCUMENTS

| | | | |
|---|---|---|---|
| 6,519,584 B1* | 2/2003 | Tognazzini | G06F 3/0481 |
| | | | 705/14.4 |
| 9,342,490 B1 | 5/2016 | Taylor et al. | |
| 2003/0221541 A1* | 12/2003 | Platt | G10H 1/0058 |
| | | | 84/609 |
| 2005/0096979 A1 | 5/2005 | Koningstein | |
| 2008/0133034 A1* | 6/2008 | Pauws | G06F 3/0482 |
| | | | 700/94 |
| 2009/0007178 A1 | 1/2009 | Artom | |
| 2009/0259535 A1 | 10/2009 | Chow | |
| 2011/0047012 A1 | 2/2011 | Sherman | |
| 2011/0126249 A1 | 5/2011 | Makhlouf | |
| 2011/0313840 A1 | 12/2011 | Mason et al. | |
| 2012/0060092 A1 | 3/2012 | Hill et al. | |
| 2014/0278920 A1 | 9/2014 | Holden | |

* cited by examiner ic # INTERACTIVE PERSONALIZED GRAPHICAL FEEDBACK OVERLAY

CROSS REFERENCE TO RELATED APPLICATIONS

This application is a continuation of U.S. application Ser. No. 14/312,591, filed Jun. 23, 2014, which claims the benefit of U.S. Provisional Application No. 61/840,939, filed Jun. 28, 2013, the contents of which are incorporated herein by reference in their entirety.

TECHNICAL FIELD

Embodiments of the invention relate, generally, to promoting the offering of promotions by a promotion and marketing service to a consumer and providing the consumer with an interface configured to promote the offering of promotions.

BACKGROUND

Providers sell goods, services and/or experiences (collectively referred to herein as "products") to consumers. Providers can often control the form of their product offers, the timing of their product offers, and the price at which the goods will be offered. Providers sell goods at brick-and-mortar sales locations, online sites, or both.

Discounts have been used as part of some retail strategies. Discount techniques include providing coupons and rebates to potential consumers. In this regard, a number of deficiencies and problems associated with the systems used to, among other things, provide discounts to consumers have been identified. Through applied effort, ingenuity, and innovation, many of these identified problems have been solved by developing solutions that are included in embodiments of the present invention, many examples of which are described in detail herein.

BRIEF SUMMARY

In general, embodiments of the present invention provide herein systems, methods and computer readable media for enabling a machine to programmatically provide an interactive feedback overlay that aids in conveying to a user implicit and/or explicit personalized functionality being provided by the system. For example, implicit personalization may include services provided by a relevance engine executing one or more algorithms in the background (including remotely at a networked system) and/or past user interactions with any networked device (such as previous financial transactions, previously purchased products, and previously purchased deal offers, among others). An example explicit personalization may include a graphical response to a user interaction with a foundational content package, which may include a promotional offer including marketing content and/or user selectable icons. The interactive feedback overlay can be updated in response to a user selecting, for example, a preference icon that indicates a user's preferred interest in one or more foundational content packages over others (e.g., marking it as a "favorite"). As such, in some embodiments, the interactive feedback overlay can be configured to visually demonstrate, using an intuitive graphical user interface displays, some reasons why various foundational content is being displayed in the layer behind the overlay.

Some embodiments may provide a machine-implemented method that includes presenting, by a processor on a display device, foundational content. The foundational content may include presenting at least one foundational content package. The foundational content package may include a preference icon that, in response to being selected, indicates a user's preference for the foundational content package. The method may also include presenting, on the display device, an interactive feedback overlay that is configured to provide personalized feedback in response to detecting a selection of the preference icon. Providing personalized feedback may include providing a visual preference acknowledgment of the selection of the preference icon using the interactive feedback overlay. According to some embodiments, the method may include enabling navigation of the foundational content independent of the interactive feedback overlay such that the interactive feedback overlay appears visually anchored in a predetermined portion of the display device during navigation of the foundational content.

In some embodiments, the method may include presenting the foundational content package, which may include presenting marketing information associated with a promotional offer for a provider product available for purchase by a consumer. The method may further include associating characteristic metadata with the foundational content package. The characteristic metadata may be used to determine the relevance of the foundational content package to preference settings associated with a user profile of the user.

According to some embodiments, the method may include enabling the navigation of the foundational content independent of the interactive feedback overlay, which may include enabling refreshing of content included in the foundational content disposed behind the interactive feedback overlay. The method may include enabling the navigation of the foundational content independent of the interactive feedback overlay, which may include enabling the scrolling of the foundational content disposed behind the interactive feedback overlay.

In some embodiments, the method may include presenting the foundational content, which may include causing the display of a plurality of foundational content packages arranged in a grid format having columns and rows. The method may further include a visual preference acknowledgement of the selection using the interactive feedback overlay that includes a telescoping file animation incorporating the interactive feedback overlay and/or drawer opening animation. In some embodiments, the visual preference acknowledgment of the selection using the interactive feedback overlay may include updating a numeric counter associated with the interactive feedback overlay. According to some embodiments, the method may further include enabling the user to select where the predetermined portion of the display is relative to the display device.

According to some embodiments, the method may include presenting a foundational content package that may include presenting a disinterested icon. In some embodiments, the selection of a disinterested icon may indicate the user's disinterest in the foundational content package associated with the disinterested icon. In some embodiments, the method may further include, in response to determining a disinterested icon has been selected, removing the foundational content package from the displayed foundational content, and updating a user profile associated with the user to include a disinterested indication of the foundational content package.

In some embodiments, the method may include, in response to the user profile being updated with the disinterested indication of the foundational content package, preventing the display of at least one similar foundational content package that has characteristic metadata likening the similar foundational content package to the disinterested foundational content package. According to some embodiments, the method may further include, in response to the user profile being updated with the disinterested indication of the foundational content package, presenting at least one different foundational content package that has characteristic metadata distinguishing the different foundational content package from the disinterested foundational content package.

Some embodiments of the present invention may provide for an apparatus comprising at least one processor, and at least one memory including computer program code, the at least one memory and the computer program code configured to, with the at least one processor, cause the apparatus to at least present, by a processor on a display device, foundational content, that includes at least one foundational content package, wherein the foundational content package includes a preference icon that, in response to being selected, indicates a user's preference for the foundational content package. The apparatus may be further configured to present, on the display device, an interactive feedback overlay that is configured to provide personalized feedback in response to detecting a selection of the preference icon, wherein providing personalized feedback includes providing a visual preference acknowledgment of the selection using the interactive feedback overlay. In some embodiments, the apparatus may be configured to enable navigation of the foundational content independent of the interactive feedback overlay such that the interactive feedback overlay appears visually anchored in a predetermined portion of the display device during navigation of the foundational content.

According to some embodiments, the apparatus may be further configured to, when presenting the foundational content package, present marketing information associated with a promotional offer for a provider product available for purchase by a consumer. The apparatus may be further configured to associate characteristic metadata with the foundational content package, wherein the characteristic metadata is used to determine the relevance of the foundational content package to preference settings associated with a user profile of the user. In some embodiments, the apparatus may be further configured to, when enabling the navigation of the foundational content independent of the interactive feedback overlay, enable refreshing of content included in the foundational content disposed behind the interactive feedback overlay.

In some embodiments, the apparatus may be further configured to, when enabling the navigation of the foundational content independent of the interactive feedback overlay, enable the scrolling of the foundational content disposed behind the interactive feedback overlay. According to some embodiments, the apparatus may be further configured to, when presenting the foundational content, cause causing the display of a plurality of foundational content packages arranged in a grid format having columns and rows.

In some embodiments, the visual preference acknowledgment of the selection using the interactive feedback overlay may include a telescoping file animation incorporating the interactive feedback overlay. Further, in some embodiments, the visual preference acknowledgment of the selection using the interactive feedback overlay may include updating a numeric counter associated with the interactive feedback overlay. According to some embodiments, the apparatus may be further configured to enable the user to select where the predetermined portion of the display is relative to the display device.

In some embodiments, the apparatus may be further configured to, when presenting the foundational content package, present a disinterested icon that, in response to being selected, indicates the user's disinterest in the foundational content package associated with the disinterested icon. According to some embodiments, the apparatus may be further configured to, in response to determining the disinterested icon has been selected, remove the foundational content package from the displayed foundational content, and update a user profile associated with the user to include a disinterested indication of the foundational content package.

According to some embodiments, the apparatus may be further configured to, in response to the user profile being updated with the disinterested indication of the foundational content package, prevent the display of at least one similar foundational content package that has characteristic metadata likening the similar foundational content package to the disinterested foundational content package. In some embodiments, the apparatus may be further configured to, in response to the user profile being updated with the disinterested indication of the foundational content package, present at least one different foundational content package that has characteristic metadata distinguishing the different foundational content package from the disinterested foundational content package. Additional embodiments may provide for associated systems, devices, and/or computer program products associated with the methods discussed herein.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

Figure 5:
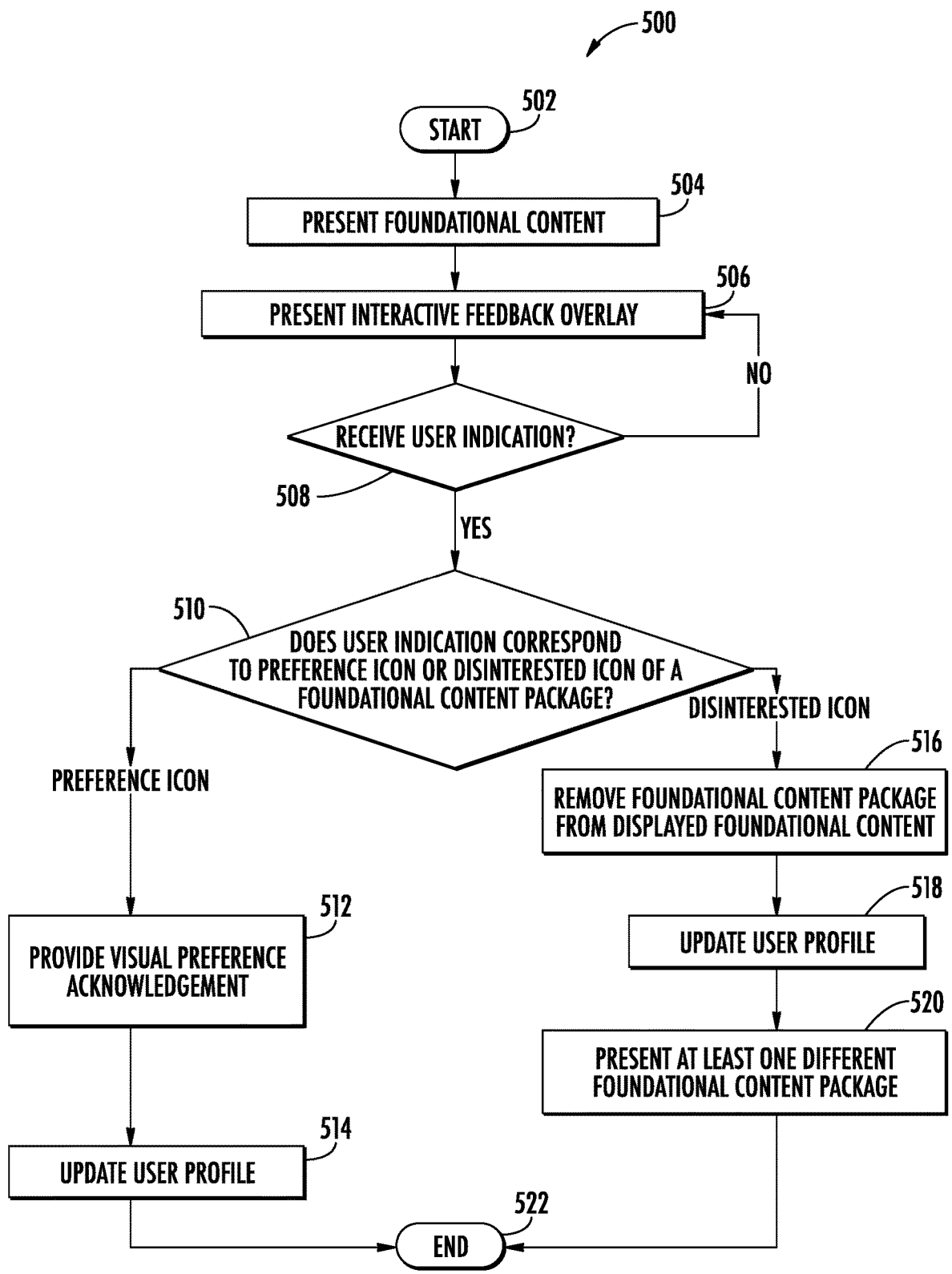
Figure 6:
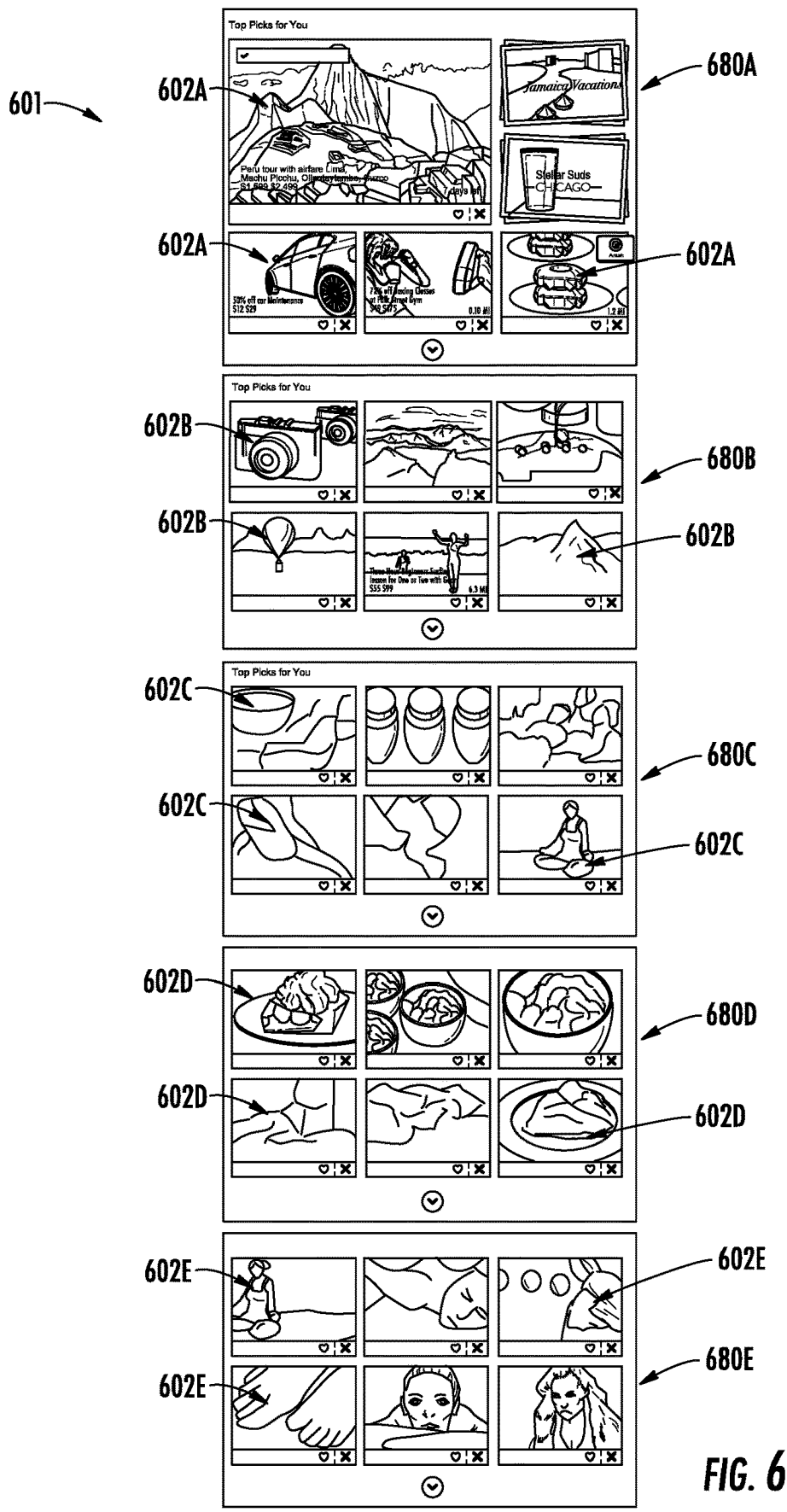

FIG. 5 illustrates a flow chart detailing an exemplary process of interacting with foundational content, via an interface, in accordance with some embodiments discussed herein; and FIG. 6 illustrates foundational content, a portion of which, may be displayed on an interface configured to provide a consumer with at least one promotion from a promotion and marketing service in accordance with some embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Definitions

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

The principles described herein may be embodied in many different forms. Not all of the depicted components may be required, however, and some implementations may include additional, different, or fewer components. Variations in the arrangement and type of the components may be made without departing from the spirit or scope of the claims as set forth herein. Additional, different, or fewer components may be provided.

As used herein, the term "provider," "merchant," and similar terms may be used interchangeably to refer to, but not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. For example, a provider may be in the form of a travel agency that provides guided travel tours to a consumer.

In addition, as used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using a travel agency as the example provider, is $1,599 for a guided travel tour, which includes airfare to the destination, worth $2,499. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the travel agency promotion as an example, the accepted value is $1,599 and the promotional value is $2,499. In this example, the residual value may be equal to the accepted value.

In addition, as used herein, the term "promotion and marketing service" may include, but is not limited to, a service that is accessible via one or more computing devices and is operable to provide example promotion and/or marketing services on behalf of one or more providers that are offering one or more instruments that are redeemable by consumers for goods, services, experiences and/or the like. The promotion and marketing service is further configured to illustrate or otherwise inform one or more consumers of the availability of one or more instruments in the form of one or more impressions. In some examples, the promotion and marketing service may also take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "instrument" may include, but is not limited to, any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned travel agency as the example provider, the instrument may include an electronic indication in a mobile application that shows the purchase of the promotion having an accepted value of $1,599 for a promotion for a guided travel tour that has a promotional value of $2,499. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "impressions" may include, but is not limited to, a communication, a display, or other perceived indication, such as a flyer, print media, e-mail, text message, application alert, mobile applications, other type of electronic interface or distribution channel and/or the like, of one or more promotions. For example, and using the aforementioned travel agency as the example provider, an impression may include an e-mail communication sent to consumers that indicates the availability of a guided travel tour with airfare included for $1,599 that is worth $2,499.

Overview

As discussed herein, a provider of goods, services, experiences and/or other products (e.g., a travel agency that provides guided travel tours) may engage with a promotion and marketing service for providing promotion and/or marketing services on behalf of the provider. For example, the promotion and marketing service may transmit to a number of consumers impressions associated with a promotion for a good, service, and/or the like provided by a provider (e.g., an e-mail indicating a consumer may purchase a vacation package worth $1,999 from a travel agency for $1,299). In addition, the promotion and marketing service may accept payments for the promotion from a consumer and issue a promotion instrument to the consumer in return for the payment. Accordingly, the consumer may present and redeem the promotion instrument to the provider in exchange for goods or services (e.g., the consumer may visit the travel agency's office and obtain airfare tickets, passes, information, and other goods and/or services associated with the vacation package by the $1,299 for $1,999 promotion instrument). In exchange for providing the promotion and/or marketing service, the promotion and marketing service may retain a portion of the revenue received from the consumer and provide the provider with the remainder of the revenues (e.g. the marketing and promotion service may retain $100 of the $1,299 and provide the travel agency with $1,199 of the $1,299 paid by the consumer for the instrument).

In some example embodiments, the method, apparatus and computer program product is configured to enable a consumer to register with a promotion system to enable the promotion and marketing service to provide the consumer with promotional impressions. In some examples, the consumer may use a consumer device, such as a smartphone, tablet, and/or any computing device to register with the promotional system. The consumer may provide the promotional system with consumer information, which may include the consumer's name, location, preferences, and/or the like. In some embodiments, the consumer device may be configured to store data corresponding to the consumer information. According to some embodiments, the consumer device may be configured to transmit data corresponding to the consumer information to the promotional system and/or store the data corresponding to the consumer information. The consumer information may be used by the promotional system and/or the consumer device to identify, provide, suggest, and/or otherwise manage promotions for the consumer that correspond with the consumer information via a promotion interface configured to provide foundational content. The foundational content may include at least one foundational content package that includes at least one icon and additional information associated with a promotion.

Example embodiments may also be directed to providing the consumer with an interactive feedback overlay that may be displayed concurrently with the foundational content. In some embodiments, the interactive feedback overlay may be configured to manage consumer settings for interacting with the promotion and marketing service. According to some embodiments, the interactive feedback overlay may be configured to provide the consumer with various options for personalizing the type of foundational content displayed in accordance with a consumer's particular preferences. For example, the interactive feedback overlay may be configured to allow a consumer to indicate particular promotional categories of interest to the consumer. In some embodiments, the interactive feedback overlay may be configured to provide the consumer with historical information corresponding to past transactions with the promotion and marketing service. In another example embodiment, the interactive feedback overlay may be configured to store and/or provide information corresponding to particular promotions, either current or future promotions, which a consumer has indicated a preference for. As such, the method, apparatus and computer product may provide a promotional interface that includes foundational content and an interactive feedback overlay to a consumer that may be configured to provide the consumer with various options for personalization.

The foregoing description applies the inventive concepts herein described to provide an exemplary interface for presenting foundational content corresponding to promotions and providing feedback corresponding to a consumer's interactions to a consumer. This application is provided for ease of illustration and is not intended to limit the scope of the claimed subject matter. Indeed, as will be apparent to one of ordinary skill in the art in view of this disclosure, the inventive concept herein described may also be applied to other presentations.

Figure 1:
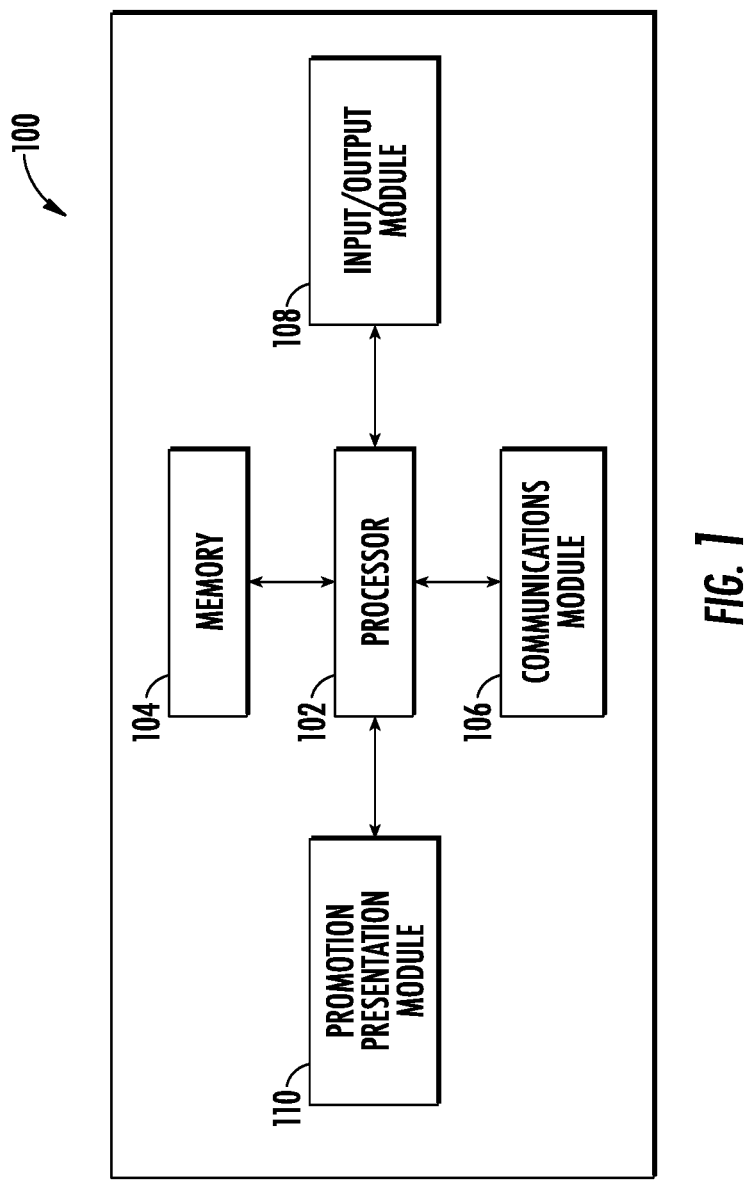
FIG. 1 illustrates a schematic block diagram of circuitry that can be included in a computing device in accordance with some embodiments discussed herein.

FIG. 1 illustrates a schematic diagram of block circuitry 100 for a consumer device that may be configured to implement some embodiments discussed herein. For example, the consumer device 100 may include a processor 102, a memory 104, a communications module 106, an input/output module 108, and/or a promotion presentation module 110. As referred to herein, "module" includes hardware, software and/or firmware configured to perform one or more particular functions. In this regard, the means of circuitry 100 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 104) that is executable by a suitably configured processing device (e.g., processor 102), or some combination thereof.

Processor 102 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments processor 102 comprises a plurality of processors. The plurality of processors may be embodied on a single computing device or may be distributed across a plurality of computing devices collectively configured to function as circuitry 100. The plurality of processors may be in operative communication with each other and may be collectively configured to perform one or more functionalities of circuitry 100 as described herein. In an example embodiment, processor 102 is configured to execute instructions stored in memory 104 or otherwise accessible to processor 102. These instructions, when executed by processor 102, may cause circuitry 100 to perform one or more of the functionalities of circuitry 100 as described herein.

Whether configured by hardware, firmware/software methods, or by a combination thereof, processor 102 may comprise an entity capable of performing operations according to embodiments of the present invention while configured accordingly. Thus, for example, when processor 102 is embodied as an ASIC, FPGA or the like, processor 102 may comprise specifically configured hardware for conducting one or more operations described herein. Alternatively, as another example, when processor 102 is embodied as an executor of instructions, such as may be stored in memory 104, the instructions may specifically configure processor 102 to perform one or more algorithms and operations described herein, such as those discussed in connection with FIGS. 4-5.

Memory 104 may comprise, for example, volatile memory, non-volatile memory, or some combination thereof. Although illustrated in FIG. 1 as a single memory, memory 104 may comprise a plurality of memory components. The plurality of memory components may be embodied on a single computing device or distributed across a plurality of computing devices. In various embodiments, memory 104 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 104 may be configured to store information, data (including promotion parameter data and/or analytics data), applications, instructions, or the like for enabling circuitry 100 to carry out various functions in accordance with example embodiments of the present invention. For example, in at least some embodiments, memory 104 is configured to buffer input data for processing by processor 102. Additionally or alternatively, in at least some embodiments, memory 104 is configured to store program instructions for execution by processor 102. Memory 104 may store information in the form of static and/or dynamic information. This stored information may be stored and/or used by circuitry 100 during the course of performing its functionalities.

Communications module 106 may be embodied as any device or means embodied in circuitry, hardware, a computer program product comprising computer readable program instructions stored on a computer readable medium (e.g., memory 104) and executed by a processing device (e.g., processor 102), or a combination thereof that is configured to receive and/or transmit data from/to another device, such as, for example, a second circuitry 100 and/or the like. In some embodiments, communications module 106 (like other components discussed herein) can be at least partially embodied as or otherwise controlled by processor 102. In this regard, communications module 106 may be in communication with processor 102, such as via a bus. Communications module 106 may include, for example, an antenna, a transmitter, a receiver, a transceiver, network interface card and/or supporting hardware and/or firmware/software for enabling communications with another computing device. Communications module 106 may be configured to receive and/or transmit any data that may be stored by memory 104 using any protocol that may be used for communications between computing devices. Communications module 106 may additionally or alternatively be in communication with the memory 104, input/output module 108 and/or any other component of circuitry 100, such as via a bus.

Input/output module 108 may be in communication with processor 102 to receive an indication of a user input and/or to provide an audible, visual, mechanical, or other output to a user (e.g., a consumer). Some example visual outputs that may be provided to a user by circuitry 100 are discussed in connection with FIGS. 2A-3D. As such, input/output module 108 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 100 is embodied as a server or database, aspects of input/output module 108 may be reduced as compared to embodiments where circuitry 100 is implemented as an end-user machine (e.g., consumer device) or other type of device designed for complex user interactions. Input/output module 108 may be in communication with the memory 104, communications module 106, and/or any other component(s), such as via a bus. Although more than one input/output module and/or other component can be included in circuitry 100, only one is shown in FIG. 1 to avoid overcomplicating the drawing (like the other components discussed herein).

Promotion presentation module 110 may also or instead be included and configured to perform the functionality discussed herein related to presenting a promotional interface, foundational content, and an interactive feedback overlay as discussed herein. In some embodiments, some or all of the functionality of presenting a promotional interface, foundational content, and an interactive feedback overlay may be performed by processor 102. In this regard, the example processes and algorithms discussed herein can be performed by at least one processor 102 and/or promotion presentation module 110. For example, non-transitory computer readable media can be configured to store firmware, one or more application programs, and/or other software, which include instructions and other computer-readable program code portions that can be executed to control each processor (e.g., processor 102 and/or promotion presentation module 110) of a consumer device. As such, a series of computer-readable program code portions are embodied in one or more computer program goods and can be used, with a computing device, server, and/or other programmable apparatus, to produce machine-implemented processes.

FIGS. 2A-3D illustrate example displays of an interface, foundational content, and an interactive feedback overlay that may be presented by one or more display screens of one or more machines, such as consumer devices, in accordance with some embodiments discussed herein. For example, the displays of FIGS. 2A-3D may be presented to a consumer by a mobile, handheld consumer device, such as a consumer device illustrated in FIG. 1. In some embodiments, the consumer device can aid in facilitating the presentation, offering, management, interaction and/or the like of one or more promotions offered by a promotion and marketing service for a provider's good, service and/or experience.

The displays of an interface, as shown in FIGS. 2A-3D, can be used to provide a relatively simple, quick, and intuitive way for the consumer to view, interact, select, purchase, and/or otherwise manage a plurality of promotions created by one or more third party machines, sometimes referred to herein as "the promotional system." Further examples of ways for a provider to create promotions and a consumer to redeem promotions are discussed in commonly-assigned U.S. Patent Application Publication No. 2011/0313840, filed Mar. 17, 2011, titled "SYSTEM AND METHODS FOR PROVIDING LOCATION BASED DISCOUNT RETAILING," which is hereby incorporated by reference in its entirety.

The displays of an interface, as shown in FIGS. 2A-3D, can be used to view promotions currently being offered for a variety of provider's goods, services and/or experiences. In some embodiments, the interface may be configured to display foundational content that may include a plurality of foundational content packages. Each of the foundational content packages may be associated with one or more virtual buttons (and/or other types of selectable/interactive options) and/or a particular promotion currently being offered, or according to some embodiments, may be offered in the future. For example, the interface may be configured to display foundational content including a foundational content package associated with a future promotion that may be available to a consumer in the near future for a provider of goods, services, experiences and/or the like. According to some embodiments, the interface may be configured to display promotional categories icon associated with promotions having similar promotional characteristics, such as the type of good, service, and/or experience provided or the location of the various promotions. For example, a promotional category icon may be associated with a number of promotions and/or foundational content packages for beer, bars, brewpubs and/or the like that are located in Chicago.

Figure 2A:
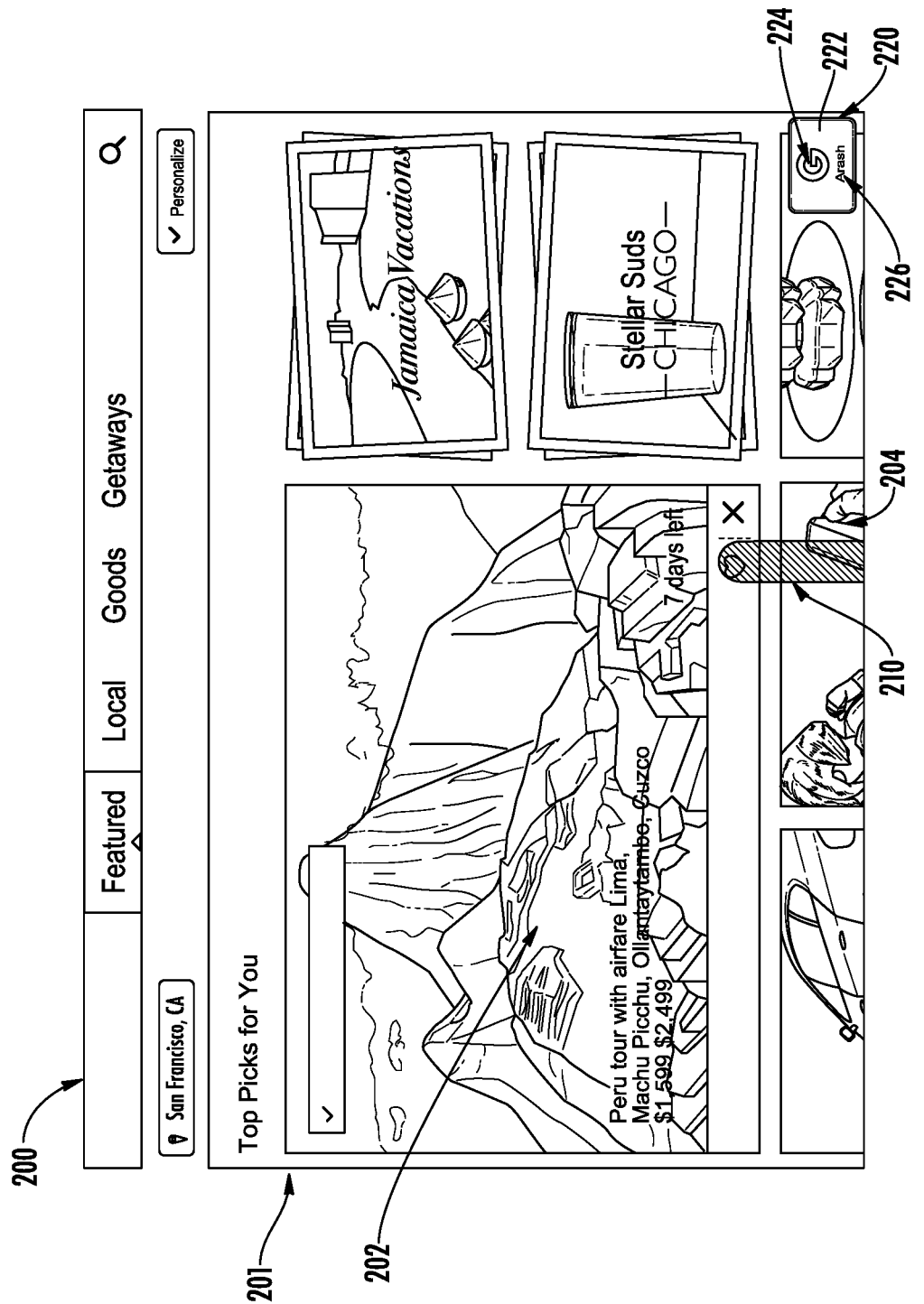
FIG. 2A illustrates an interface configured to provide a consumer with foundational content and an interactive feedback overlay in accordance with some embodiments discussed herein.
Figure 2B:
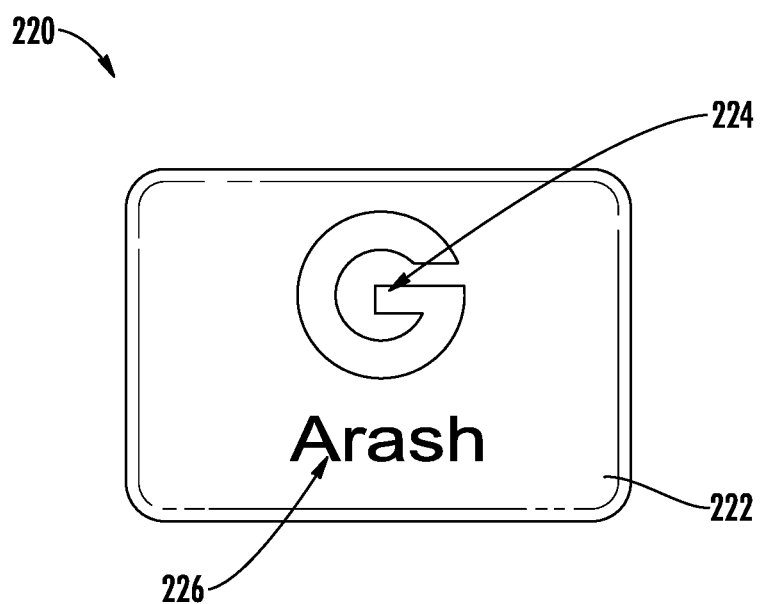
FIG. 2B illustrates a detailed view of the interactive feedback overlay illustrated in FIG. 2A in accordance with some embodiments discussed herein.
Figure 2C:
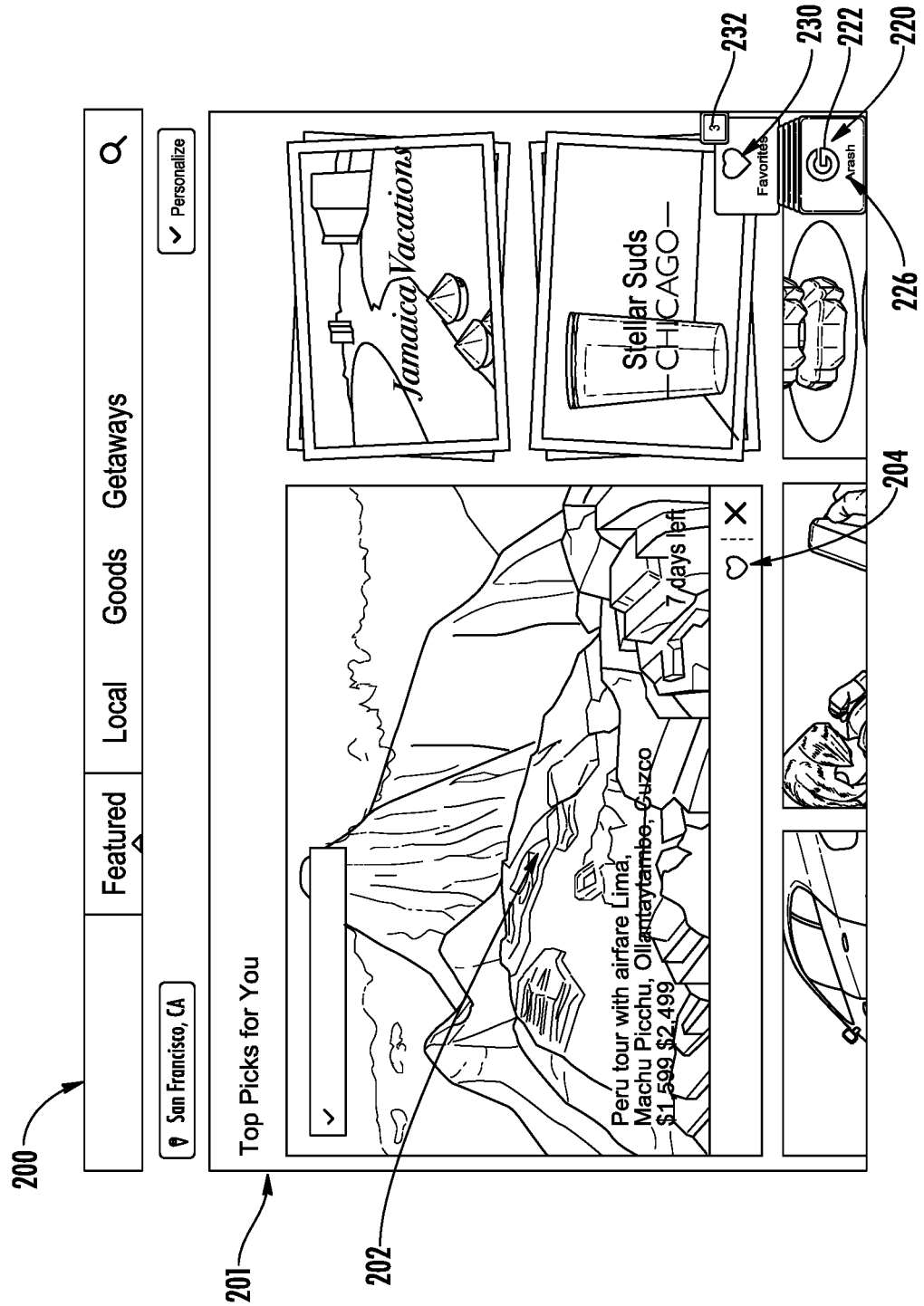
FIG. 2C illustrates an interface configured to provide a consumer with foundational content and an interactive feedback overlay in accordance with some embodiments discussed herein.
Figure 2D:
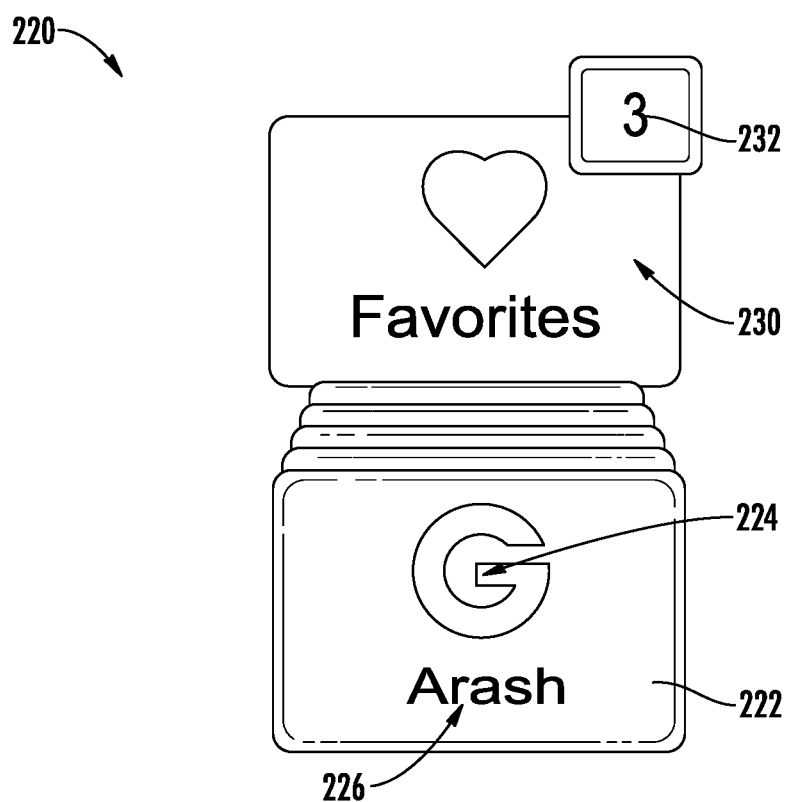
FIG. 2D illustrates a detailed view of the interactive feedback overlay illustrated in FIG. 2C in accordance with some embodiments discussed herein.
Figure 2E:
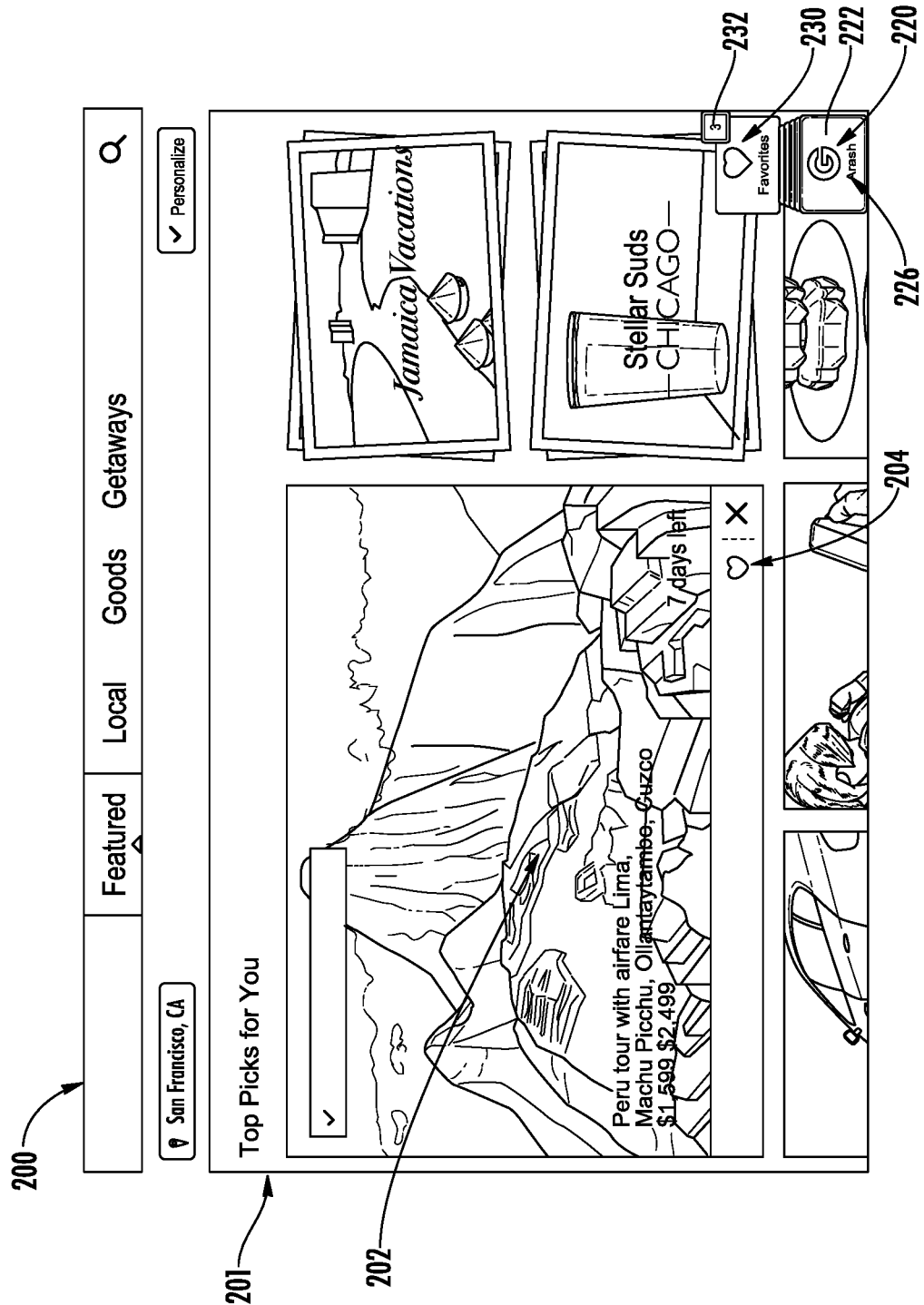
FIGS. 2E-2H illustrate an interface configured to provide a consumer with at least one promotion from a promotion and marketing service in accordance with some embodiments discussed herein.
Figure 2F:
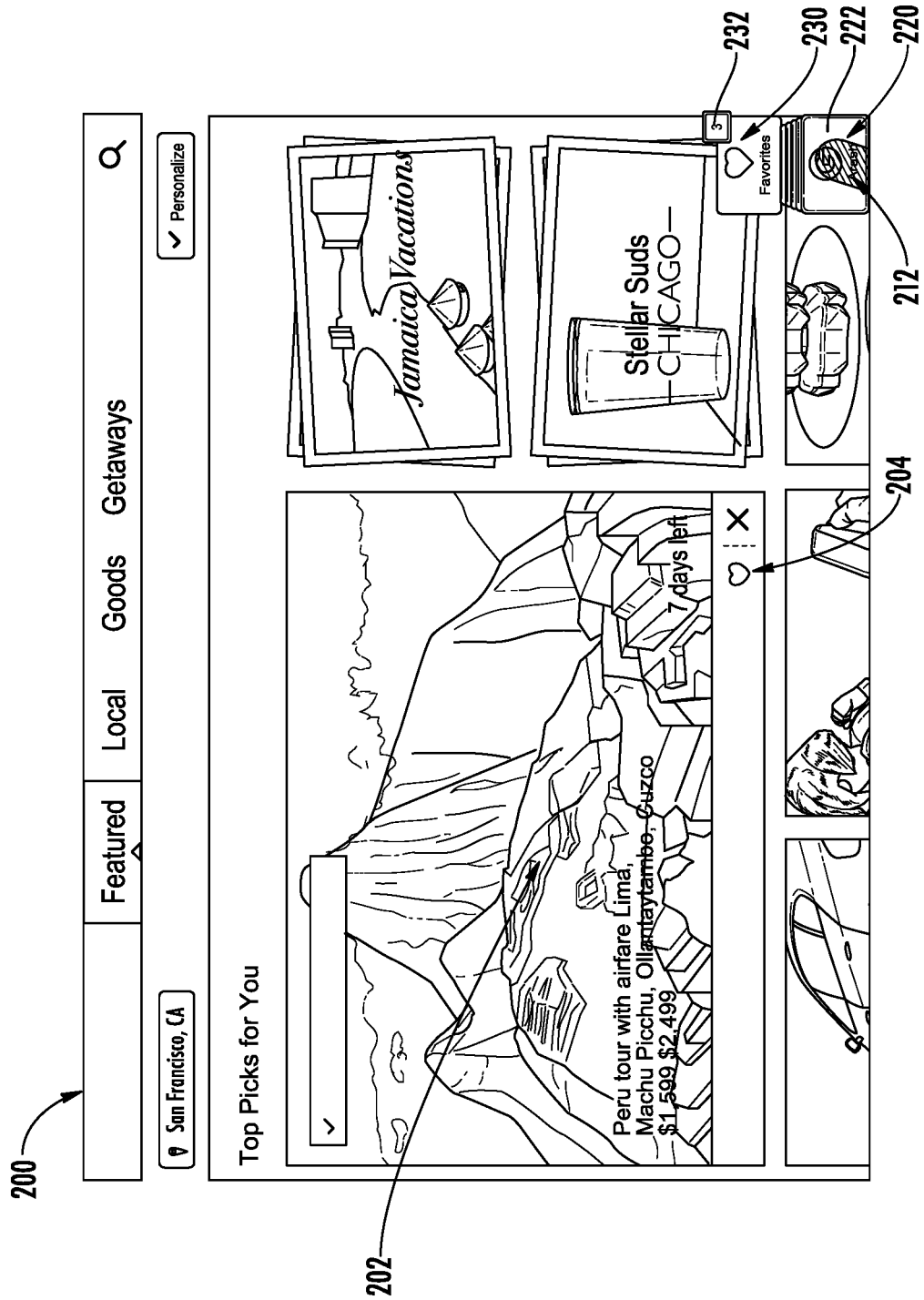
Figure 2G:
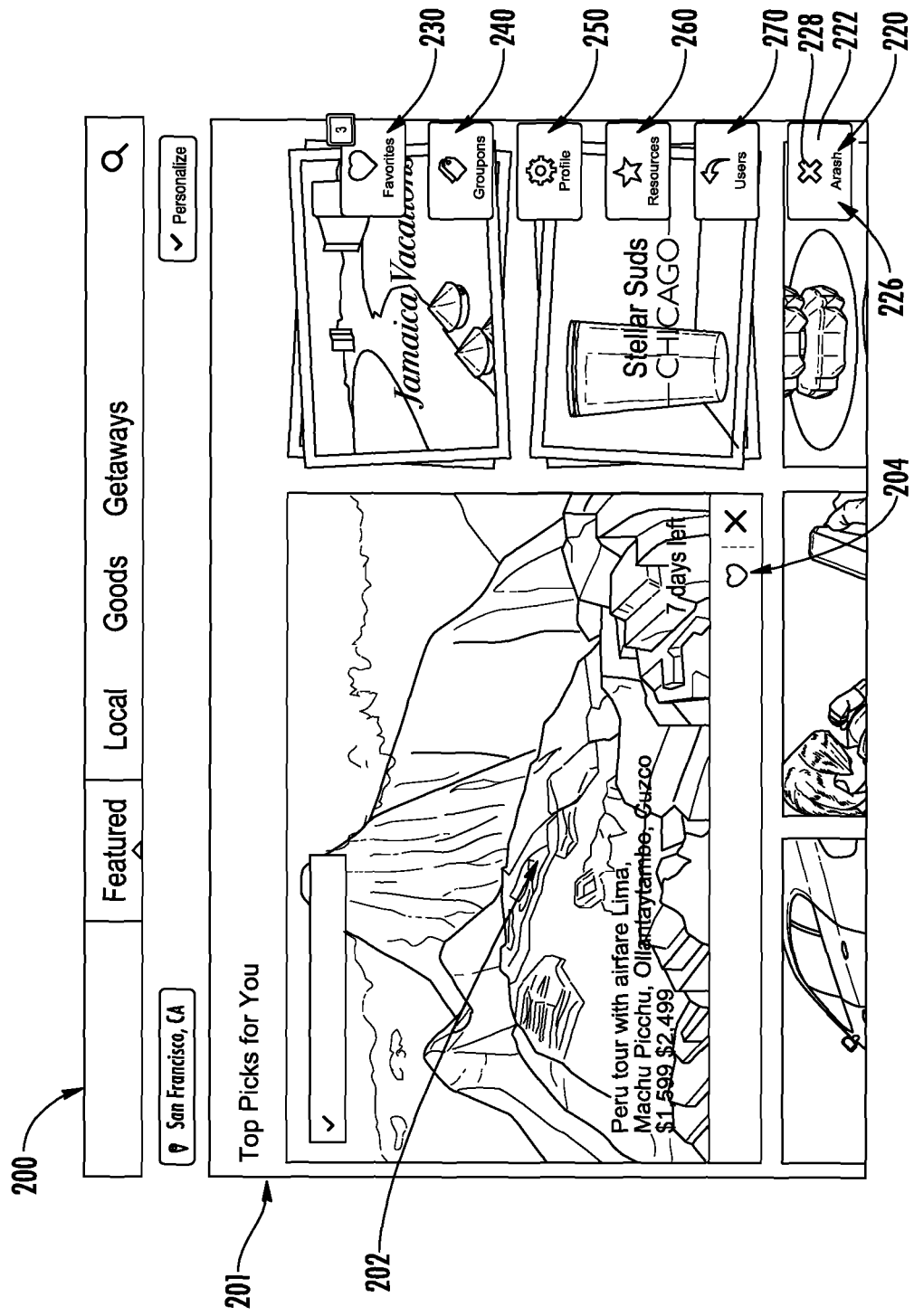
Figure 2H:
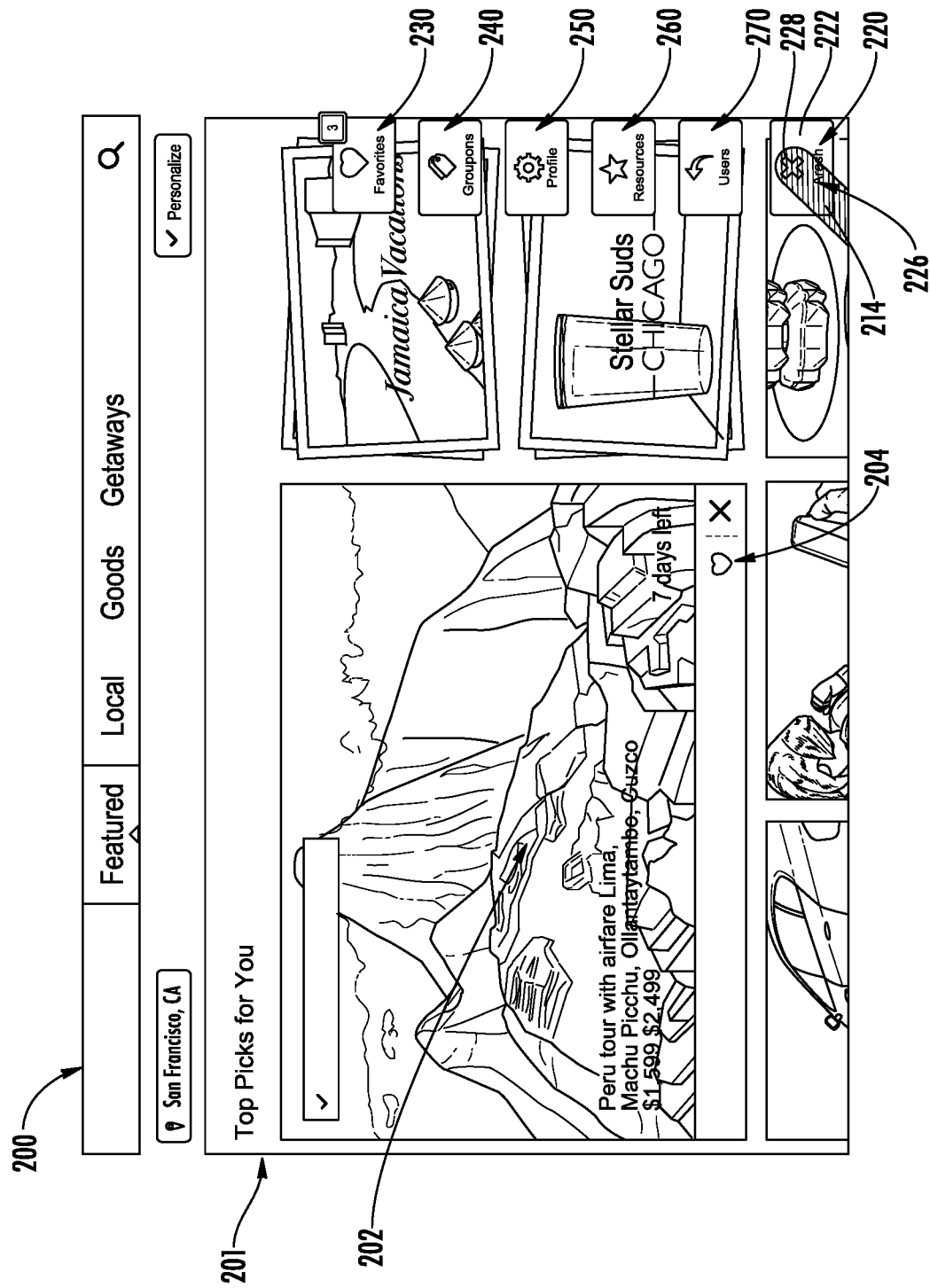
Figure 3A:
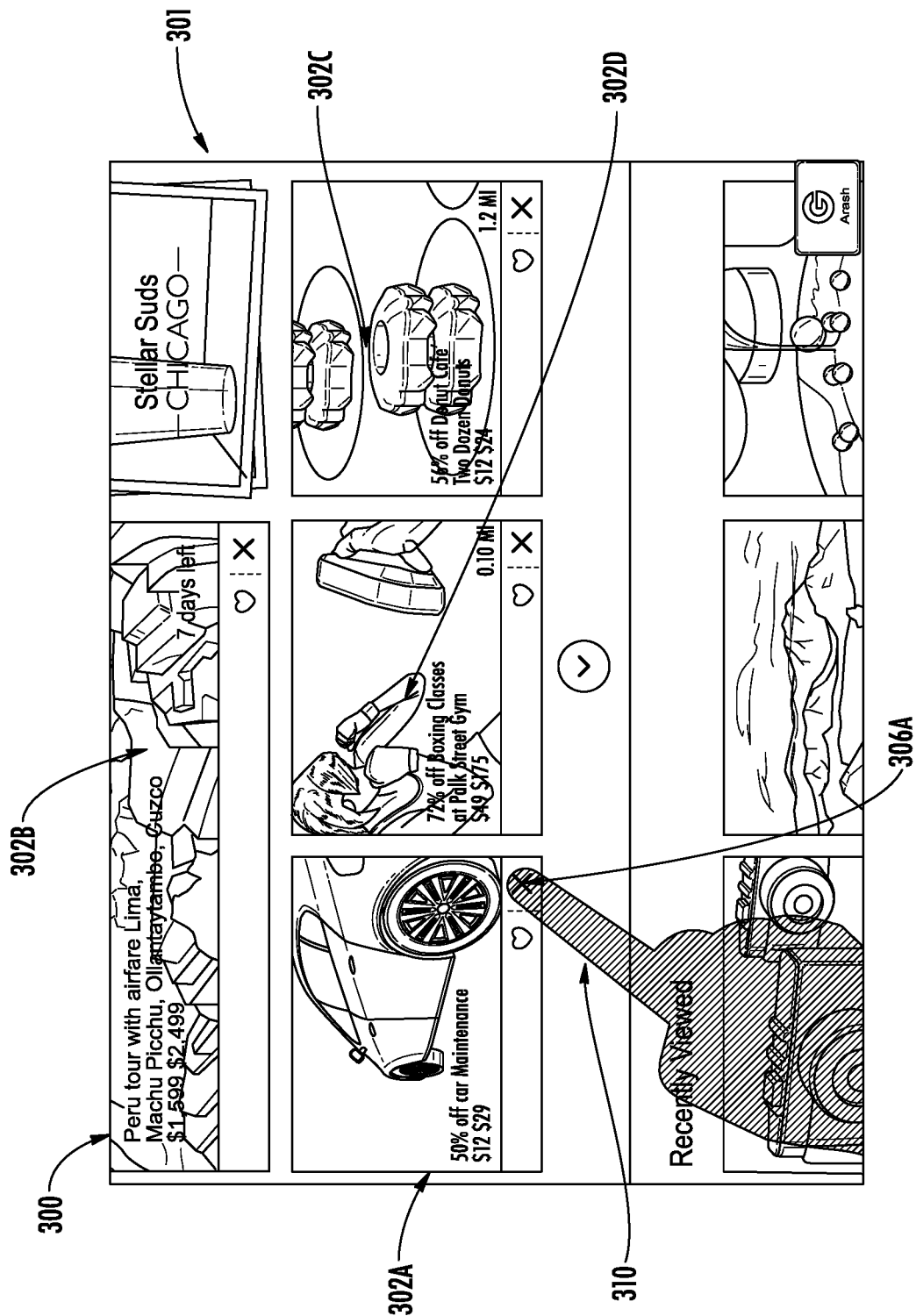
FIGS. 3A-3D illustrate an interface configured to provide a consumer with foundational content and an interactive feedback overlay in accordance with some embodiments discussed herein.
Figure 3B:
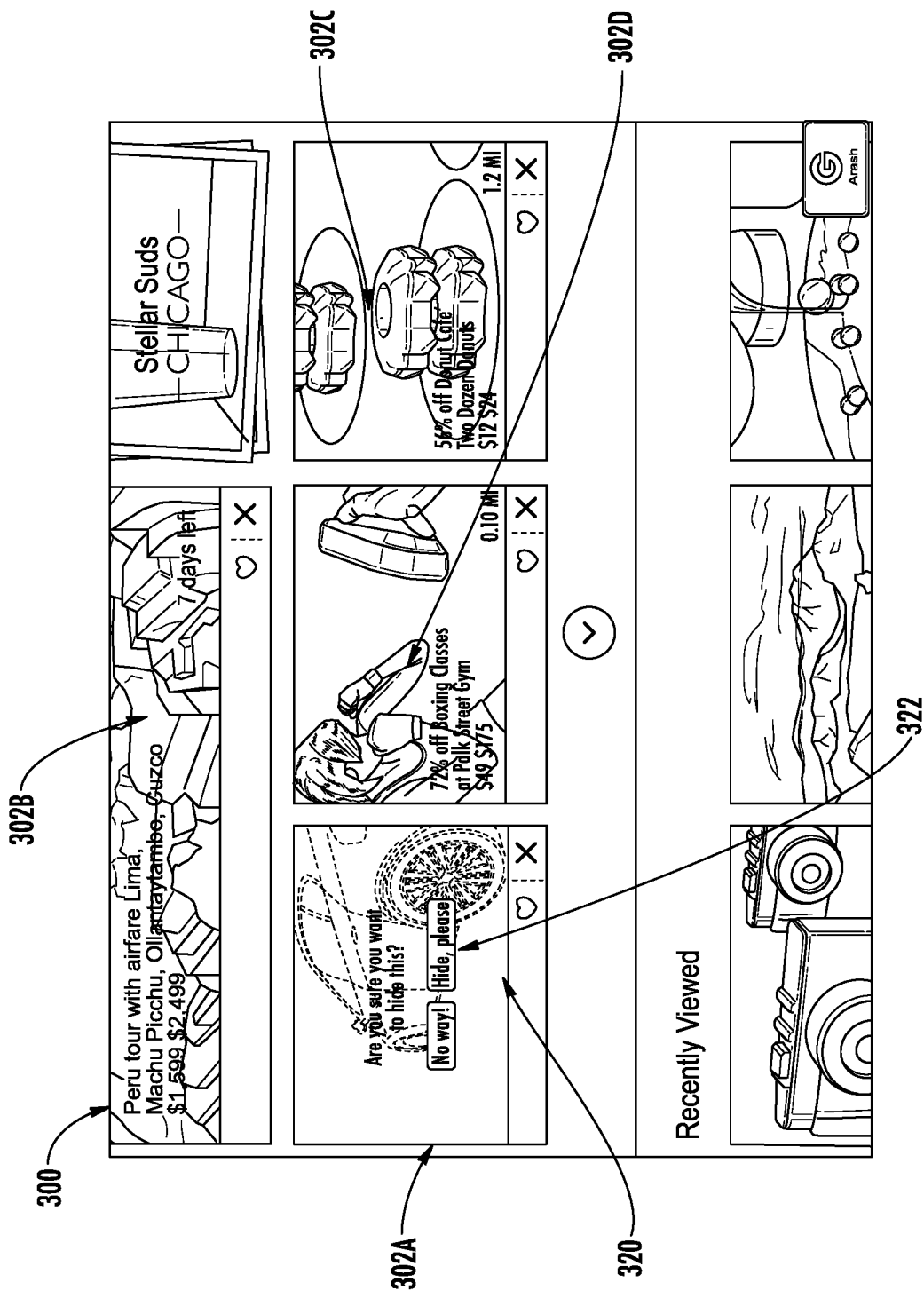
Figure 3C:
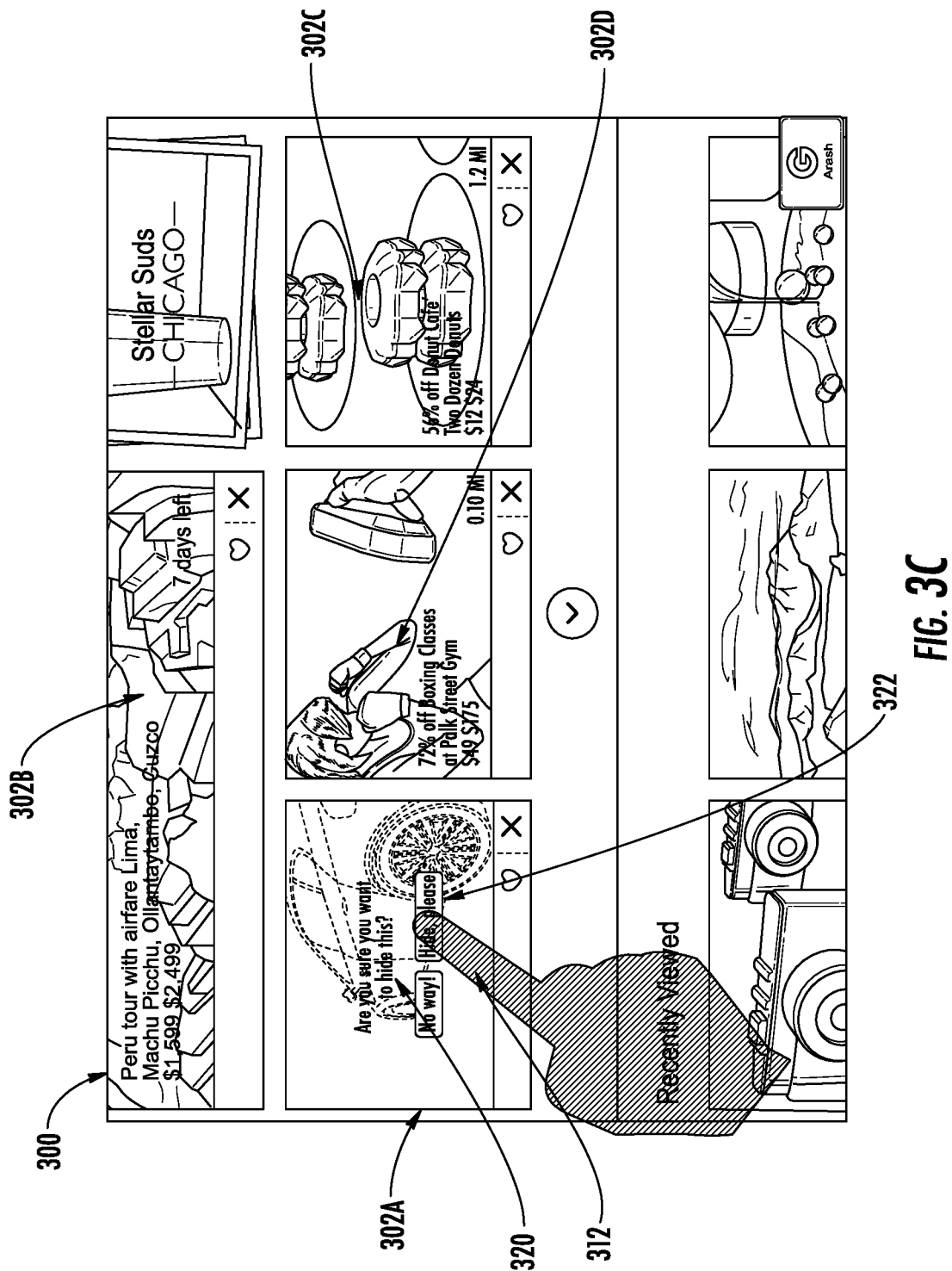
Figure 3D:
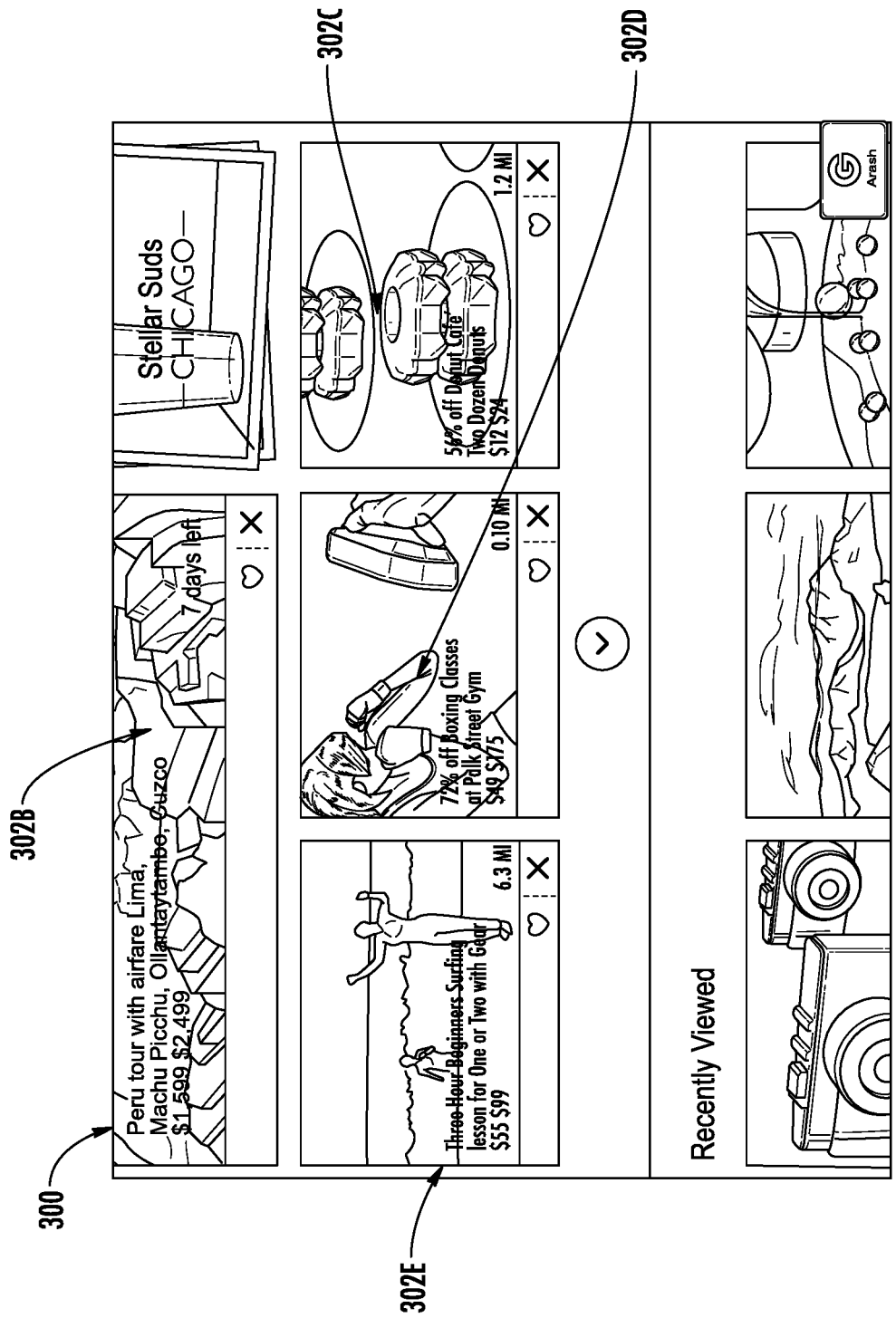
Figure 4:
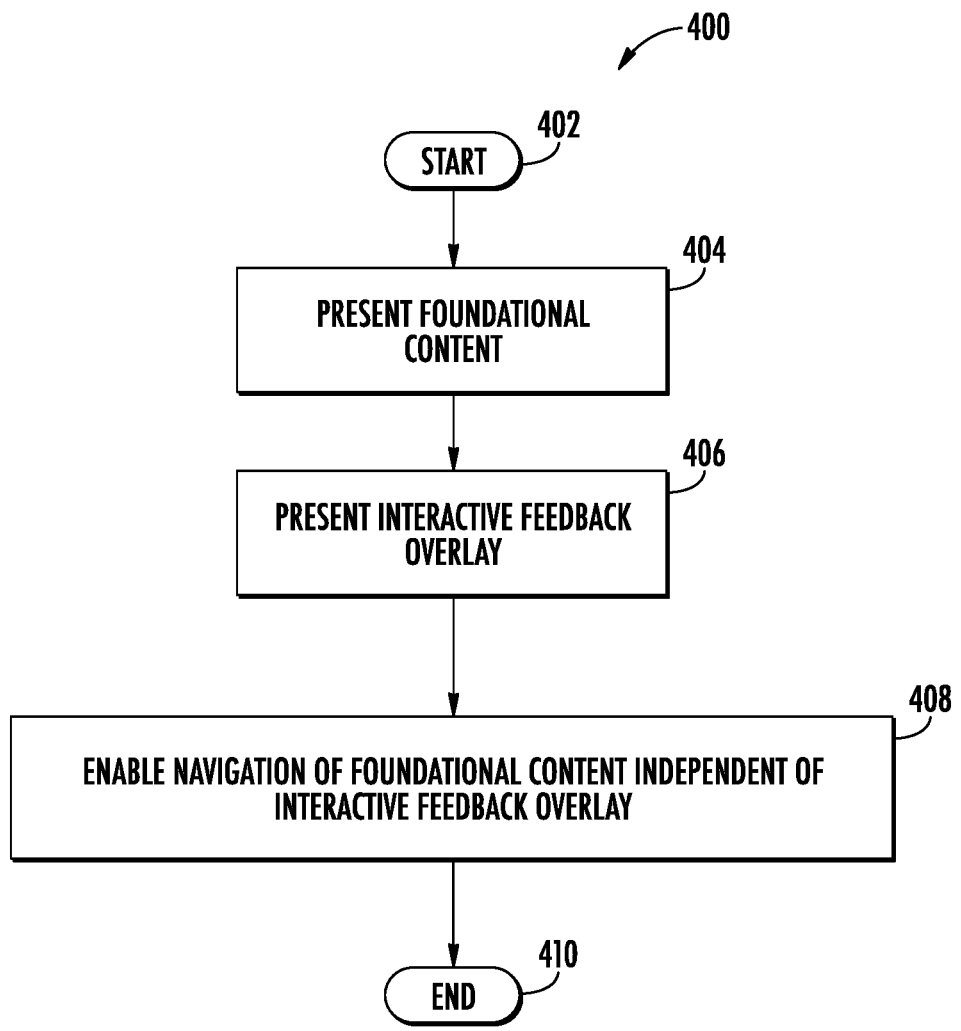
FIG. 4 illustrates a flow chart detailing an exemplary process of presenting a consumer with foundational content and an interactive feedback overlay, via an interface, in accordance with some embodiments discussed herein.

FIG. 4 illustrates an example method, namely process 400, that may be executed by one or more machines (some examples of which are discussed in connection with FIG. 1) to provide the displays of FIGS. 2A-3D, among others, in accordance with various embodiments discussed herein. Process 400 starts at 402 and presents foundational content on a display, such as a touch screen display, at 404. In one example, a consumer device may be configured to display foundational content 201 on an interface 200 of FIG. 2A on a touch screen display, such as that included in a tablet and/or other type of computing machine.

In some embodiments, the display may be further configured to display an interactive feedback overlay at 406. According to some embodiments, a consumer device may be configured to display the interactive feedback overlay 220 on an interface 200, as shown in FIGS. 2A and 2B, on a touch screen display. In some embodiments, the interface 200 may be configured to display foundational content 201 within a portion of the interface 200. In some embodiments, the foundational content 201 and the interactive feedback overlay 220 may be displayed as layers with respect to one another. For example, as shown in FIG. 2A, the interactive feedback overlay 220 may be displayed as a layer that is positioned, with respect to the consumer, in front of a layer comprising the foundational content 201. FIG. 2B illustrates a detailed view of the interactive feedback overlay 220 provided in FIG. 2A.

At 408, the process 400 may include enabling navigation of the foundational content independent of interactive feedback overlay. For example, in some embodiments, the display 200 may further be configured to display foundational content 201 that may be configured to move independently (e.g., in response to detecting a user interaction therewith) from other content, portions, and/or the like displayed on the interface. According to some embodiments, the foundational content 201 may be moved with respect to the display in a scrolling fashion. In some embodiments, the foundational content 201 may be refreshed with additional foundational content after detecting an input to the device to display additional foundational content. During the navigation of the foundational content, such as movement of the foundational content with respect to the display device, the interactive feedback overlay 220 is configured to remain in a predetermined portion of the display device such that the interactive feedback overlay appears to be visually anchored in the predetermined portion with respect to the display device and/or interface. The process 400 may end at 410.

According to some embodiments, as shown in FIG. 2A, the interface 200 may be configured to display foundational content 201 that may include at least one foundational content package 202. In addition, referring to FIG. 6, an interface may be configured to display at least a portion of the foundational content 601 that may include a plurality of content generators 680. Although FIG. 6 illustrates a total amount of foundational content 601 that may be displayed by an interface, the interface may be configured to display only a first portion of the foundational content, and may be further configured to enable the navigation of the foundational content such that a second portion of the foundational content is displayed, wherein the second portion is different from the first portion of the foundational content.

According to some embodiments, the foundational content may further include categories and/or content generators (e.g., widgets) 680A, 680B, 680C, 680D, 680E that may comprise information corresponding to various categories and/or groupings of foundational content packages. For example, as shown in FIG. 6, content generator 680A may correspond to foundational content packages that have been provided to the consumer based, at least, upon a consumer's individual preferences and/or characteristic metadata associated with a foundational content package 602A that has been determined to be relevant to a consumer's preference settings that are associated with a consumer's profile. In some embodiments, content generator 680 may correspond to a content generator 680B for foundational content containing foundational content packages 602B that have been recently viewed by the consumer. According to some embodiments, a content generator 680C may correspond to foundational content containing foundational content packages 602C associated with promotions that are located proximate a consumer's home location. In some embodiments, a content generator 608D may include foundational content including foundational content packages 602D associated with food and drink promotions because the consumer has previously indicated a preference for food and drink promotions. Further, some content generators 680E may correspond to foundational content containing foundational content packages 602E that are associated with health and beauty promotions because the consumer has previously indicated a preference for health and beauty promotions. Although the embodiment disclosed in FIG. 6 illustrates foundational content 601 having five content generators 680, one of ordinary skill in the art may appreciate that any number of content generators may be included in the foundational content. In some embodiments, a content generator may include a widget, such as a widget discussed in commonly-assigned U.S. patent application Ser. No. 13/930,519, filed Jun. 28, 2013, titled "METHOD AND APPARATUS FOR GENERATING AN ELECTRONIC COMMUNICATION," which is hereby incorporated by reference in its entirety.

Returning to FIG. 2A, the interface 200 may include foundational content 201 that includes a foundational content package 202 associated with a particular promotion. The foundational content package 202 may include a number of icons and/or other indicia, information, and/or data associate with the particular promotion and/or foundational content package. For example, the foundational content package 202 may include information associated with the promotion, such as a title "Peru tour with airfare Lima, Machu Picchu, Ollantaytambo, Cuzco." In addition, the foundational content package 202 may include information corresponding to the promotion, such as a promotional value (e.g., $2,499), and a promotional cost (e.g., $1,599). The foundational content package 202 may further include information corresponding to the number of promotions available, the time limit until the offer for the promotion expires, and/or an explanation for why a particular promotion is being provided by the interface. In some example embodiments, the foundational content package may include any type of information corresponding to the particular promotion.

As previously mentioned, the foundational content package may include a number of icons, images, and/or other indicia. As used herein, the term "icon" may include, but is not limited to, any type of graphical user interface object, such as a picture, image, and/or symbol that may correspond with a particular function, data, process, and/or the like. For example, as shown in FIG. 2A, a number of foundational content packages 202 displayed on a touch screen display may include an icon, such as a preference icon 204. In some embodiments, as shown in FIG. 3A, foundational content 301 may include a foundational content package 302A that includes an icon, such as a disinterested icon 306A.

Referring to FIG. 5, a process 500 may include receiving an input corresponding to a consumer touch input to a touch display and providing a personalized feedback and/or refreshing, changing, and/or modifying the foundational content in response to the input. Process 500 may start at 502 and present foundational content at 504. The process 500 may then present an interactive feedback overlay at 506.

At 508, the process may wait for a user indication, such as a consumer touch input, corresponding to the selection of a graphical user interface object, such as a preference icon, a disinterested icon, and/or the like and determine whether or not a user indication, such as for example, a consumer touch input 210 of the selection of the preference icon 204 as shown in FIG. 2A, has been received by a processor of the consumer device. If no user indication corresponding to a selection of a graphical user interface object is detected, the process may return to presenting the foundational content and/or the interactive feedback overlay.

Although the interfaces of the displays of FIGS. 2A-3D are shown as being optimized for a touch-sensitive device, the functionality discussed in connection with the displays of FIGS. 2A-3D may be provided by one or more machines having any suitable display screen in accordance with embodiments discussed herein. For example, the display may be provided by a machine that has a non-touch-sensitive display and a mouse and/or other input component, such as a touchpad for example, can be configured to provide at least some of the functionality discussed herein.

At 510, the process may include, in response to determining a selection of a graphical user interface object has been detected, determining whether the selection of the graphical user interface object corresponds to a preference icon or a disinterested icon of a foundational content package by a processor and/or promotion presentation module of the consumer device. If the user indication corresponds to a preference icon of a particular foundational content package, the process may proceed to 512 and provide a visual preference acknowledgement.

According to some embodiments, a visual preference acknowledgement corresponding to a determination of a user selection of a preference icon associated with a particular foundational content package may include any number of visual acknowledgments. For example, as shown in FIG. 2C, a visual preference acknowledgement may include presenting a change and/or modification to, and/or a different preference icon 204. As illustrated in FIG. 2C, one example visual preference acknowledgement may include presenting a color-filled preference icon (e.g., filling the heart-outline preference icon in red, changing heart-outline preference icon to solid red heart preference icon, etc.). Although a "heart-outlined" shape and/or other visual identifiers are referred to herein and shown in the drawings, any suitable shape, color, and/or other type of identifiers may be used without departing from the spirit of the invention.

In some embodiments, providing a visual preference acknowledgement may include presenting a plurality of visual preference acknowledgements on a display screen. For example, interface 200 may include other graphical user interface objects in addition to the preference icon 204. In some embodiments, the interface 200 may be configured to display an interactive feedback overlay 220 that may include a consumer identification icon 222. As shown in FIG. 2B, an interactive feedback overlay 220 may include a consumer identification icon 222 that may include a promotion and marketing service identifier indicia 224, such as a letter "G," which may correspond with the name of the promotion and marketing service. According to some embodiments, the consumer identification icon 222 may include a consumer identification indicia 226, such as the consumer's name, account number, and/or any unique/consumer-specific identifying data. Returning to process 500 of FIG. 5, in response to determining at 508 that a user indication has been received and corresponds to a preference icon at 510 (e.g., preference icon 204 has been selected), process 500 provides a plurality of visual preference acknowledgements that may include presenting a change and/or modification to a preference icon and presenting a change, modification, animation, and/or a different interactive feedback overlay 220.

FIG. 2C illustrates an example display of an interface 200 that may be presented at 512 and shows an example preference icon 204 that has changed in response to determining that the preference icon has previously been selected. In addition, FIG. 2C illustrates an interface presenting an interactive feedback overlay 220 that may be changed, modified, animated, and/or different in response to determining that a preference icon has been previously selected. FIG. 2D illustrates a detailed view of the interactive feedback overlay that may be changed, modified, animated, and/or different in response to determining that a preference icon has been previously selected. As shown in FIGS. 2C-2E, the interactive feedback overlay 220 may be configured to provide an animation corresponding to a determination of a user selection of a preference icon associated with a particular foundational content package has been detected.

According to some embodiments, a visual preference acknowledgement may include an animation incorporating the interactive feedback overlay. In some embodiments, the animation may include the consumer identification icon 222 moving vertically in an up and down motion (i.e., bouncing up and down) to acknowledge the indication corresponding to the user selection has been received and detected. According to some embodiments, an outline of the consumer identification icon 222 may remain stationary, while a portion of the consumer identification icon, such as promotion and marketing service identification indicia 224 may move, such as in a vertical repeating fashion (i.e., bouncing up and down), to acknowledge the indication corresponding to the user selection has been received and detected.

In some embodiments, a visual preference acknowledgement may include an animation incorporating an interactive feedback overlay 220 comprising a plurality of graphical user interface objects. As shown in FIGS. 2G and 2H, the interactive feedback overlay 220 may include a number of graphical user interface objects, such as a consumer identification icon 222, a preferred promotions icon 230, a promotion management icon 240, a consumer profile icon 250, a promotional reward icon 260, and/or a consumer login icon 270.

Returning to FIGS. 2C-2E, a visual preference acknowledgement may include an animation incorporating any number of icons associated with the interactive feedback overlay. For example, one visual preference acknowledgment animation may include a "drawer pull" animation. According to some embodiments, the "drawer pull" animation may include presenting the plurality of graphical user interface objects associated with the interactive feedback overlay 220 in a manner corresponding to the act of opening a file cabinet that includes a plurality of files, folders, and the like therein. As shown in FIGS. 2C and 2D, the interface is configured to provide a visual preference acknowledgement that includes presenting the consumer identification icon 222 of the interactive feedback overlay 220 as the file cabinet face, first file, and/or the like. The additional graphical user interface objects (i.e., promotion management icon, etc.) associated with the interactive feedback overlay may be presented behind the consumer identification icon 222 so as to simulate files disposed within a file cabinet or files located behind a first file.

According to some embodiments, the "drawer pull" animation may further include an animation corresponding to a particular file being selected and removed from a file cabinet. As shown in FIGS. 2C and 2D, a preferred promotions icon 230 may be moved upwards from the plurality of icons of the interactive feedback overlay 220 to simulate a particular file (e.g., a preferred promotions icon) being selected and/or removed from a file cabinet. According to some embodiments, the preferred promotions icon 230 may further include a preferred promotions counter 232 configured to provide a visual preference acknowledgement corresponding to the determining of a user indication associated with a selection of a preference icon of a particular foundational content package has been detected and received by a processor of a consumer device.

In some embodiments, the preferred promotions counter 232 may be configured to display the total number of foundational content packages that a user has selected as preferred foundational content packages. In some embodiments, such as shown in FIGS. 2C-2H, the preferred promotions counter 232 may include Arabic numerals indicating the total number of foundational content packages that a user has selected as preferred foundational content packages. In another embodiment, the preferred promotions counter may include Roman numerals indicating the total number of foundational content packages that a user has selected as preferred foundational content packages. According to some embodiments, the preferred promotions counter may include a number of markings that correspond with and indicate the total number of foundational content packages that a user has selected as preferred foundational content packages.

As shown in FIGS. 2C-2E, a visual preference acknowledgment may, at least, include presenting a change to a preferred promotions counter 232 that corresponds with determining a selection of a preference icon. In some embodiments, the visual preference acknowledgment may, at least, include presenting an interactive feedback overlay configured to provide an animation, movement, and/or the like, such as an animation (e.g., a "drawer pull" animation) incorporating the interactive feedback overlay, and presenting an animation of a graphical user interface object associated with the interactive feedback overlay, such as presenting an animation of a preferred promotions icon (e.g., a counter change).

According to some embodiments, the process 500 may proceed to update a user profile at 514 after providing a visual preference acknowledgement corresponding to determining a selection of the preference icon at 510. In some embodiments, updating a user profile may include transmitting data corresponding to the selection of the preference icon. In some embodiments, the process 500 may transmit data corresponding to the selection of the preference icon concurrently with providing the visual preference acknowledgment at 512. Referring to FIG. 1, the circuitry 100 of a consumer device may transmit data corresponding to the selection of the preference icon with the communications module 106. In some embodiments, the communications module 106 may transmit data corresponding to the selection of the preference icon to a promotional system. According to some embodiments, data transmitted to a promotional system that corresponds with an indication of a selection of a preference icon may be analyzed, aggregated, and/or manipulated to provide the user (i.e., consumer) with additional foundational content packages that corresponds with the foundational content package of the selected preference icon. In some embodiments, the process may include transmitting data corresponding to the selection of the preference icon concurrently with providing a visual preference acknowledgement that includes an animation of an interactive feedback overlay.

According to some embodiments, updating a user profile at 514 may be accomplished with the consumer device. For example, circuitry, such as the processor 102, memory 104, and/or promotion presentation module 110 of the consumer device may be configured to detect a user indication corresponding to a selection of a preference icon associated with a particular foundational content package, determine characteristic metadata associated with the particular foundational content package, and/or store data corresponding to the characteristic metadata associated with the particular foundational content package. Accordingly, the consumer device may be configured to provide additional foundational content packages that include characteristic metadata similar to the particular foundational content package associated with the preference icon previously selected. According to some embodiments, circuitry 100 of the consumer device may be configured to transmit, to a promotional system, data corresponding to the characteristic metadata associated with the particular foundational content package previously selected. In some embodiments, the process may include a promotional system analyzing, determining, aggregating, storing, and/or the like data corresponding to the characteristic metadata of the selected foundational content package and updating a consumer's profile, which may be stored as consumer data within the promotional system and/or consumer device, with instructions to provide foundational content packages with similar characteristic metadata to the characteristic metadata of the selected foundational content package. The process may end at 522.

If the process 500 determines that a user indication corresponds to a selection of a disinterested icon of a foundational content package at 510, the process may include removing the foundational content package associated with the disinterested icon from the foundational content displayed on the interface at 516. For example, as shown in FIG. 3A, a foundational content package 302A, may include a disinterested icon 306A associated with the foundational content package 302A. Upon determining a user input, such as consumer touch input 310, corresponds with a selection of the disinterested icon 306A associated with a particular foundational content package, the process 500 may be configured to remove the foundational content package from the foundational content.

According to some embodiments, the interface 300 may be configured to provide a confirmation image 320 associated with the foundational content package 302A, as shown in FIG. 3B. In some embodiments, the process may include waiting, for example, for a selection of a graphical user interface object, such as confirmation button 322. In some embodiments, the confirmation image 320 may be semi-transparent. According to another embodiment, the confirmation image 320 may be superimposed over at least a portion of the foundational content package 302A that corresponds with the disinterested icon previously determined to have been selected by a user. In some embodiments, the confirmation image 320 may be opaquely superimposed over the foundational content package 302A. In another embodiment, the confirmation image may replace the foundational content package displayed on the interface.

The process may further include determining whether or not a user indication, such as a consumer touch input 312, corresponding to the selection of the confirmation button has been received by a processor of the consumer device before removing the foundational content package from the displayed foundational content at 516. FIG. 3C illustrates an example display of an interface 300 that shows an example confirmation image 320 that includes a confirmation button 322, where the confirmation image has been superimposed in a semi-transparent fashion over the specific foundational content package associated with the selection of the disinterested icon 306A.

According to some embodiments, in response to determining a user indication associated with the selection of the confirmation button 322 has been received by a processor of the consumer device, the consumer device may be configured to remove the foundational content package from the displayed foundational content at 516. In some embodiments, the process 500 may further include, in response to removing the foundational content package from the displayed foundational content and/or determining a user indication associated with the selection of the confirmation button has been received, updating a user profile at 518.

In some embodiments, updating a user profile at 518 may include transmitting data corresponding to the removal of a foundational content package from the displayed foundational content. In some embodiments, the process 500 may transmit data corresponding to the removal of the foundational content package concurrently with determining a selection of a confirmation button 322 of a confirmation image 320. Referring to FIG. 1, the circuitry 100 of a consumer device may transmit data corresponding to the selection of the confirmation button 320 with the communications module 106. In some embodiments, the communications module 106 may transmit data corresponding to the selection of the confirmation button to a promotional system. According to some embodiments, data transmitted to a promotional system that corresponds with an indication of a selection of a confirmation button may be analyzed, aggregated, and/or manipulated to provide the user (i.e., consumer) with at least one different foundational content package that is different from the now-removed foundational content package. In some embodiments, the process may include transmitting data corresponding to the selection of the confirmation button concurrently with removing the foundational content package associated with the confirmation button.

According to some embodiments, updating a user profile at 518 may be accomplished with the consumer device. For example, circuitry, such as the processor 102, memory 104, and/or promotion presentation module 110 of the consumer device may be configured to detect a user indication corresponding to a selection of a confirmation button associated with a particular foundational content package, determine characteristic metadata associated with the particular foundational content package, and/or store data corresponding to the characteristic metadata associated with the particular foundational content package. Accordingly, the consumer device may be configured to provide additional foundational content packages that include characteristic metadata different from the characteristic metadata of the particular foundational content package associated with the confirmation button previously selected. According to some embodiments, circuitry 100 of the consumer device may be configured to transmit, to a promotional system, data corresponding to the characteristic metadata associated with the particular foundational content package previously removed. In some embodiments, the process may include a promotional system analyzing, determining, aggregating, storing, and/or the like data corresponding to the characteristic metadata of the selected foundational content package previously removed and updating a consumer's profile, which may be stored as consumer data within the promotional system and/or consumer device, with instructions to provide foundational content packages with characteristic metadata different to the characteristic metadata of the removed foundational content package.

For example, as shown in FIG. 3A, the consumer has provided a consumer touch input 310 corresponding to a selection of a disinterested icon for a foundational content package 302A that provides a consumer with a 50% discount off a car maintenance package. Turning to FIG. 3C, by providing an input (i.e., consumer touch input 312) corresponding to a selection of a confirmation button 322, data may be transmitted to a promotional system that may be configured to analyze the particular aspects and/or characteristics of the foundational content package 302A that most likely motivated the user to remove the foundational content package from the foundational content and/or the promotion interface 300. For example, if the consumer had been removing all foundational content packages related to car maintenance and the like, the promotional system may be configured to transmit data to the promotional interface that comprises instructions to not display any foundational content packages related to automobiles and/or automobile maintenance.

Returning to FIG. 5, the process 500 may then proceed to provide a replacement foundational content package 302E, as shown in FIG. 3D, to the promotional interface 300 in response to removing the previous foundational content package and/or determining a user indication associated with the selection of the confirmation button 322 has been received by a processor of the consumer device. In some embodiments, the replacement foundational content package 302E may include characteristic metadata that is different from the characteristic metadata of the removed foundational content package and/or may include characteristic metadata that corresponds with characteristic metadata of foundational content packages associated with a selected preference icon. The process may end at 522.

Returning to FIG. 2A-2F, the interface 200 may be configured to present an interactive feedback overlay 220 that includes a plurality of configurations. For example, as shown in FIG. 2A and FIG. 2B, the interactive feedback overlay may be displayed on an interface in a minimal configuration. In the minimal configuration, the interactive feedback overlay may be configured to only display a consumer identification icon 222 on the interface 200. Referring to FIGS. 2C-2E, the interactive feedback overlay 220 may be displayed in another configuration, such as a passive configuration. In a passive configuration, the interactive feedback overlay may be configured to provide a visual preference acknowledgement without receiving an input, such as a consumer touch input, to the interactive feedback overlay to prompt such a provision of a visual preference acknowledgement. Referring to FIGS. 2F-2H, the interactive feedback overlay may further be configured to be displayed in an active configuration. In an active configuration, the plurality of graphical user interface objects, such as a consumer identification icon 222, a preferred promotions icon 230, a promotion management icon 240, a consumer profile icon 250, a promotional reward icon 260, and/or a consumer login icon 270, may all be displayed on the promotional interface 200.

In some embodiments, the interactive feedback overlay 220 may be configured to switch between any of the various configurations. For example, the interactive feedback overlay may be configured to change from one configuration to another configuration in response to determining a user input, such as a consumer touch input 212, as shown in FIG. 2F. According to some embodiments, in response to determining a consumer touch input 212 associated with a consumer identification icon 222 of an interactive feedback overlay 220, the interactive feedback overlay may change from a passive configuration, as illustrated in FIG. 2F, to an active configuration, as shown in FIGS. 2G and 2H. Likewise, when an interactive feedback overlay is displayed in an active configuration, the interactive feedback overlay may change from the active configuration to a minimal and/or passive configuration in response to determining a user input, such as a consumer touch input 214, as shown in FIG. 2H. Although illustrated as changing from the passive configuration to the active configuration in FIGS. 2F and 2H, one of ordinary skill in the art may appreciate that the interactive feedback overlay may be configured to change from any first configuration to a different second configuration in response to receiving a user input that corresponds with a selection of the consumer identification icon and/or any other graphical user interface object configured to switch the configurations of interactive feedback overlay.

As shown in FIG. 2G, an active configuration of the consumer settings overlay may include a number of graphical interface objects, such as a preferred promotions icon 230, a promotion management icon 240, a consumer profile icon 250, a promotional reward icon 260, a consumer login icon 270, and/or a consumer identification icon 222. According to some embodiments, the active configuration of the consumer settings overlay may be configured to provide the user with various options for managing the user's interaction with the promotion and marketing service. In some embodiments, the active configuration of the consumer settings overlay may include displaying each of the graphical user interface objects that correspond with each of the options for managing the user's interaction with the promotion and marketing service. In another embodiment, the active configuration includes displaying each of the graphical user interface objects that are configured to receive a user indication, such as a consumer touch input, corresponding to the selection of any of the graphical user interface objects. In contrast to other configurations, such as the minimal configuration and/or passive configuration, the active configuration of the interactive feedback overlay may be the only configuration where the plurality of graphical user interface objects are able to receive a user indication corresponding to the selection of the graphical user interface object.

In addition, as shown in FIGS. 2G and 2H, when the interactive feedback overlay is presented in the active configuration, the consumer identification icon 222 may be presented in a different manner than the consumer identification icon of a consumer settings overlay presented in a passive configuration and/or a minimal configuration. For example, at least a portion of the consumer identification icon 222 may change colors when presented in an active configuration of an interactive feedback overlay.

In another embodiment, when a consumer identification icon 222 comprising a promotion and marketing service identifier indicia 224, as shown in FIGS. 2A and 2B in a minimal configuration, is presented in a different manner, such as the active configuration illustrated in FIGS. 2G and 2H, the consumer identification icon may change by removing the promotion and marketing service identifier indicia and presenting an active configuration termination indicia 228, as shown in FIGS. 2G and 2H. According to some embodiments, when presented in the active configuration, the interactive feedback overlay may include a graphical user interface object, such as the consumer identification icon 222, that is configured to receive a user indication, such as a consumer touch input 214, corresponding to a user selection of the consumer identification icon. As shown in FIG. 2H, determining a selection, such as a consumer touch input 214, of the consumer identification icon 222 of an interactive feedback overlay in an active configuration may cause a processor and/or promotion presentation module to cause the interactive feedback overlay to change from an active to a minimal and/or passive configuration.

It is also noted that all or some of the information presented by the example displays discussed herein can be based on data that is received, generated and/or maintained by one or more components of a promotional system. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 102 and/or promotion presentation module 110 discussed above with reference to FIG. 1, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 104) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, wherein the at least one memory and the computer program code are configured to, with the at least one processor, cause the apparatus to at least:
   present, by the at least one processor and on a display device of the apparatus, an interactive feedback overlay that is configured to provide personalized feedback in response to detecting a first user indication confirming a selection of a promotion category;
   determine, by the at least one processor, a plurality of content generators based at least in part on the promotion category and characteristic metadata associated with the plurality of content generators; and
   present, on the display device, foundational content comprising the plurality of content generators, wherein each of the plurality of content generators comprises a plurality of foundational content packages, wherein each of the plurality of foundational content packages comprises a corresponding preference icon and a corresponding disinterested icon, wherein the interactive feedback overlay is visually anchored in a predetermined portion of the display device, enabling navigation of the foundational content independent of the interactive feedback overlay, wherein the at least one memory and the computer program code are configured to, with the at least one processor, cause the apparatus to:
   detect a second user indication confirming a first disinterested icon selection associated with a first corresponding disinterest icon of a first foundational content package of the plurality of foundational content packages;
   detect a third user indication indicating an additional foundational content display request; and
   in response to detecting the second user indication and the third user indication:
      select a second foundational content package, wherein the second foundational content package is associated with a second characteristic metadata dissimilar to a first characteristic metadata associated with the first foundational content package; and
      refresh the foundational content to remove the first foundational content package and present the second foundational content package on the display device.

2. The apparatus of claim 1, wherein the foundational content is disposed behind the interactive feedback overlay, wherein enabling navigation of the foundational content comprises enabling scrolling of the foundational content independent of the interactive feedback overlay.

3. The apparatus of claim 1, wherein each of the plurality of content generators comprises a plurality of foundational content packages, wherein the plurality of foundational content packages comprise at least one common characteristic metadata.

4. The apparatus of claim 3, wherein the at least one common characteristic metadata comprises location metadata associated with a user profile.

5. The apparatus of claim 3, wherein each of the plurality of foundational content packages comprises a disinterested icon, wherein the at least one memory and the computer program code are configured to, with the at least one processor, cause the apparatus to further:
   remove, by the at least one processor, at least one second foundational content package from the plurality of content generators displayed on the display device, wherein the at least one second foundational content package comprises characteristic metadata similar to the characteristic metadata associated with the first foundational content package.

6. The apparatus of claim 5, wherein the at least one memory and the computer program code are configured to, with the at least one processor, cause the apparatus to further:
   update a user profile to include a disinterested indication of the first foundational content package and the at least one second foundational content package.

7. The apparatus of claim 6, wherein the at least one memory and the computer program code are configured to, with the at least one processor, cause the apparatus to further:
subsequent to updating the user profile, prevent presenting, on the display device, at least one similar foundational content package that comprises characteristic metadata likening the at least one similar foundational content package to the first foundational content package.

8. The apparatus of claim 1, wherein the interactive feedback overlay is configured to switch between a minimal configuration comprising a consumer identification icon and an active configuration comprising the consumer identification icon and a preferred promotions icon, wherein the consumer identification icon comprises a consumer identification indicia and is configured to receive at least one user indication, wherein the at least one memory and the computer program code are configured to, with the at least one processor, cause the apparatus to:
in response to receiving the at least one user indication on the consumer identification icon, cause the interactive feedback overlay to switch from the minimal configuration to the active configuration.

9. A machine-implemented method, comprising:
presenting, by at least one processor and on a display device, an interactive feedback overlay that is configured to provide personalized feedback in response to detecting a first user indication confirming a selection of a promotion category;
determining, by the at least one processor, a plurality of content generators based at least in part on the promotion category and characteristic metadata associated with the plurality of content generators; and
presenting, on the display device, foundational content comprising the plurality of content generators, wherein each of the plurality of content generators comprises a plurality of foundational content packages, wherein each of the plurality of foundational content packages comprises a corresponding preference icon and a corresponding disinterested icon, wherein the interactive feedback overlay is visually anchored in a predetermined portion of the display device, enabling navigation of the foundational content independent of the interactive feedback overlay, wherein the machine-implemented method comprises:
detecting a second user indication confirming a first disinterested icon selection associated with a first corresponding disinterest icon of a first foundational content package of the plurality of foundational content packages;
detecting a third user indication indicating an additional foundational content display request; and
in response to detecting the second user indication and the third user indication:
selecting a second foundational content package, wherein the second foundational content package is associated with a second characteristic metadata dissimilar to a first characteristic metadata associated with the first foundational content package; and
refreshing the foundational content to remove the first foundational content package and present the second foundational content package on the display device.

10. The machine-implemented method of claim 9, wherein the foundational content is disposed behind the interactive feedback overlay, wherein enabling navigation of the foundational content comprises enabling scrolling of the foundational content independent of the interactive feedback overlay.

11. The machine-implemented method of claim 9, wherein each of the plurality of content generators comprises a plurality of foundational content packages, wherein the plurality of foundational content packages comprise at least one common characteristic metadata.

12. The machine-implemented method of claim 11, wherein the at least one common characteristic metadata comprises location metadata associated with a user profile.

13. The machine-implemented method of claim 11, wherein each of the plurality of foundational content packages comprises a disinterested icon, wherein the machine-implemented method further comprises:
removing, by the at least one processor, at least one second foundational content package from the plurality of content generators displayed on the display device, wherein the at least one second foundational content package comprises characteristic metadata similar to the characteristic metadata associated with the first foundational content package.

14. The machine-implemented method of claim 13, further comprising:
updating a user profile to include a disinterested indication of the first foundational content package and the at least one second foundational content package.

15. The machine-implemented method of claim 14, further comprising:
subsequent to updating the user profile, preventing presenting, on the display device, at least one similar foundational content package that comprises characteristic metadata likening the at least one similar foundational content package to the first foundational content package.

16. A computer program product, the computer program product comprising at least one non-transitory computer-readable storage medium having program code portions stored therein, the program code portions, which when executed by an apparatus, causing the apparatus at least to:
present, on a display device of the apparatus, an interactive feedback overlay that is configured to provide personalized feedback in response to detecting a first user indication confirming a selection of a promotion category;
determine a plurality of content generators based at least in part on the promotion category and characteristic metadata associated with the plurality of content generators; and
present, on the display device, foundational content comprising the plurality of content generators, wherein each of the plurality of content generators comprises a plurality of foundational content packages, wherein each of the plurality of foundational content packages comprises a corresponding preference icon and a corresponding disinterested icon, wherein the interactive feedback overlay is visually anchored in a predetermined portion of the display device, enabling navigation of the foundational content independent of the interactive feedback overlay, wherein the program code portions, when executed by the apparatus, cause the apparatus to:
detect a second user indication confirming a first disinterested icon selection associated with a first corresponding disinterest icon of a first foundational content package of the plurality of foundational content packages;

detect a third user indication indicating an additional foundational content display request; and in response to detecting the second user indication and the third user indication:

select a second foundational content package, wherein the second foundational content package is associated with a second characteristic metadata dissimilar to a first characteristic metadata associated with the first foundational content package; and refresh the foundational content to remove the first foundational content package and present the second foundational content package on the display device.

17. The computer program product of claim 16, wherein the foundational content is disposed behind the interactive feedback overlay, wherein enabling navigation of the foundational content comprises enabling scrolling of the foundational content independent of the interactive feedback overlay.

18. The computer program product of claim 16, wherein each of the plurality of content generators comprises a plurality of foundational content packages, wherein the plurality of foundational content packages comprise at least one common characteristic metadata.

19. The computer program product of claim 18, wherein the at least one common characteristic metadata comprises location metadata associated with a user profile.

\* \* \* \* \*